(12) United States Patent
Nangia et al.

(10) Patent No.: US 8,249,193 B2
(45) Date of Patent: Aug. 21, 2012

(54) REFERENCE SIGNAL SEQUENCE REPRESENTATION IN WIRELESS COMMUNICATION DEVICE

(75) Inventors: Vijay Nangia, Algonquin, IL (US); Brian K. Classon, Palatine, IL (US); Hyejung Jung, Palatine, IL (US)

(73) Assignee: Motorola Mobility LLC, Libertyville, IL (US)

( * ) Notice: Subject to any disclaimer, the term of this patent is extended or adjusted under 35 U.S.C. 154(b) by 928 days.

(21) Appl. No.: 12/205,580

(22) Filed: Sep. 5, 2008

(65) Prior Publication Data

US 2010/0062716 A1    Mar. 11, 2010

(51) Int. Cl.
*H04L 27/20* (2006.01)
(52) U.S. Cl. ..................................... 375/308
(58) Field of Classification Search .......... 375/308; 370/336
See application file for complete search history.

(56) References Cited

U.S. PATENT DOCUMENTS

| | | | |
|---|---|---|---|
| 7,318,185 B2 | 1/2008 | Khandani et al. | |
| 2008/0240285 A1* | 10/2008 | Han et al. | 375/295 |
| 2008/0267137 A1* | 10/2008 | Dabak et al. | 370/336 |
| 2008/0318528 A1* | 12/2008 | Hooli et al. | 455/62 |
| 2012/0076097 A1* | 3/2012 | Han et al. | 370/329 |

OTHER PUBLICATIONS

3GPP TSG RAN WG1#49BIS; R1-072848; Orlando, USA; Jun. 25-29, 2007; 8 pages.
3GPP TSG-RAN WG1#50; R1-073319; Athens, Greece; Aug. 20-24, 2007; 24 pages.
3GPP TSG RAN WG1 #50; R1-073419; Athens, Greece; Aug. 20-24, 2007; 3 pages.
3GPP RAN WG1 #50; R1-073754; Athens, Greece; Aug. 20-24, 2007; 10 pages.
3GPP TSG RAN1 #50; R1-073846; Aug. 20-24, 2007; Athens, Greece; 4 pages.
Samsung, Ericsson, Panasonic, LGE, Freescale, Texas Instruments, Sharp, Qualcomm, Nokia, NSN, Motorola, Nortel, NTT DoCoMo; UL RS: Outcome of Offline Discussions; R1-073878; 3 Pages.
3GPP TS 36.211, V1.3.1; "3rd Generation Partnership Project; Technical Specification Group Radio Access Network; Evolved Universal Terrestrial Radio Access (E-UTRA); Physical Channels and Modulation (Release 8)"; (Aug. 2007) 51 Pages.
Draft 3GPP TS 25.213, V7.2.0; 3rd Generation Partnership Project; Technical Specification Group Radio Access Network; Spreading and Modulation (FDD) (Release 7); (2007-);32 Pages.
3GPP TSG RAN1 #53BIS.; R1-082333; Warsaw, Poland; Jun. 30-Jul. 4, 2008; 9 Pages.
3GPP TSG RAN1 #53.; R1-082059; Kansas City, USA; May 5-9, 2008; 6 Pages.

\* cited by examiner

*Primary Examiner* — Sam K Ahn
*Assistant Examiner* — Shawkat M Ali
(74) *Attorney, Agent, or Firm* — Roland K. Bowler, II

(57) ABSTRACT

A wireless communication device including a controller communicably coupled to a transceiver. In one embodiment, the controller generates a QPSK sequence having multiple elements wherein each element includes real and imaginary parts. In another embodiment, the sequence is selected from a groups of sequences stored on a user terminal. Thereafter, the controller generates a reference signal based on the information representative of the selected QPSK sequence.

10 Claims, 2 Drawing Sheets

REFERENCE SIGNAL SEQUENCE REPRESENTATION IN WIRELESS COMMUNICATION DEVICE

FIELD OF THE DISCLOSURE

The present disclosure relates generally to wireless communications and more particularly to the representation of reference signal sequences, for example, QPSK sequences, in wireless communication terminals.

BACKGROUND

In the developing 3GPP Long Term Evolution (LTE) of the Universal Mobile Telecommunications System (UMTS), it has been proposed that the user terminal use QPSK sequences for the generation of uplink reference signals. It was also decided that the user terminal would generate extended Zadoff-Chu (ZC) sequences for allocations of three (3) or more resource blocks to user terminals. For allocations of one (1) or two (2) resource blocks, 3GPP LTE user terminals will likely use "computer generated" sequences previously stored on the user terminal for the generation of uplink reference signals.

It is recognized generally that desirable sequence properties include a relatively low cubic metric (CM), good cross-correlation, and low complexity, which reduces memory requirements. Using QPSK sequences for the generation of reference signals provides an upper bound of 24 or 48 bits per sequence for 1 and 2 resource blocks, respectively, on the required memory. Using ZC sequences also reduces memory and provides improved CM and cross-correlation properties.

The various aspects, features and advantages of the disclosure will become more fully apparent to those having ordinary skill in the art upon a careful consideration of the following Detailed Description thereof with the accompanying drawings described below. The drawings may have been simplified for clarity and are not necessarily drawn to scale.

DETAILED DESCRIPTION

Figure 1:
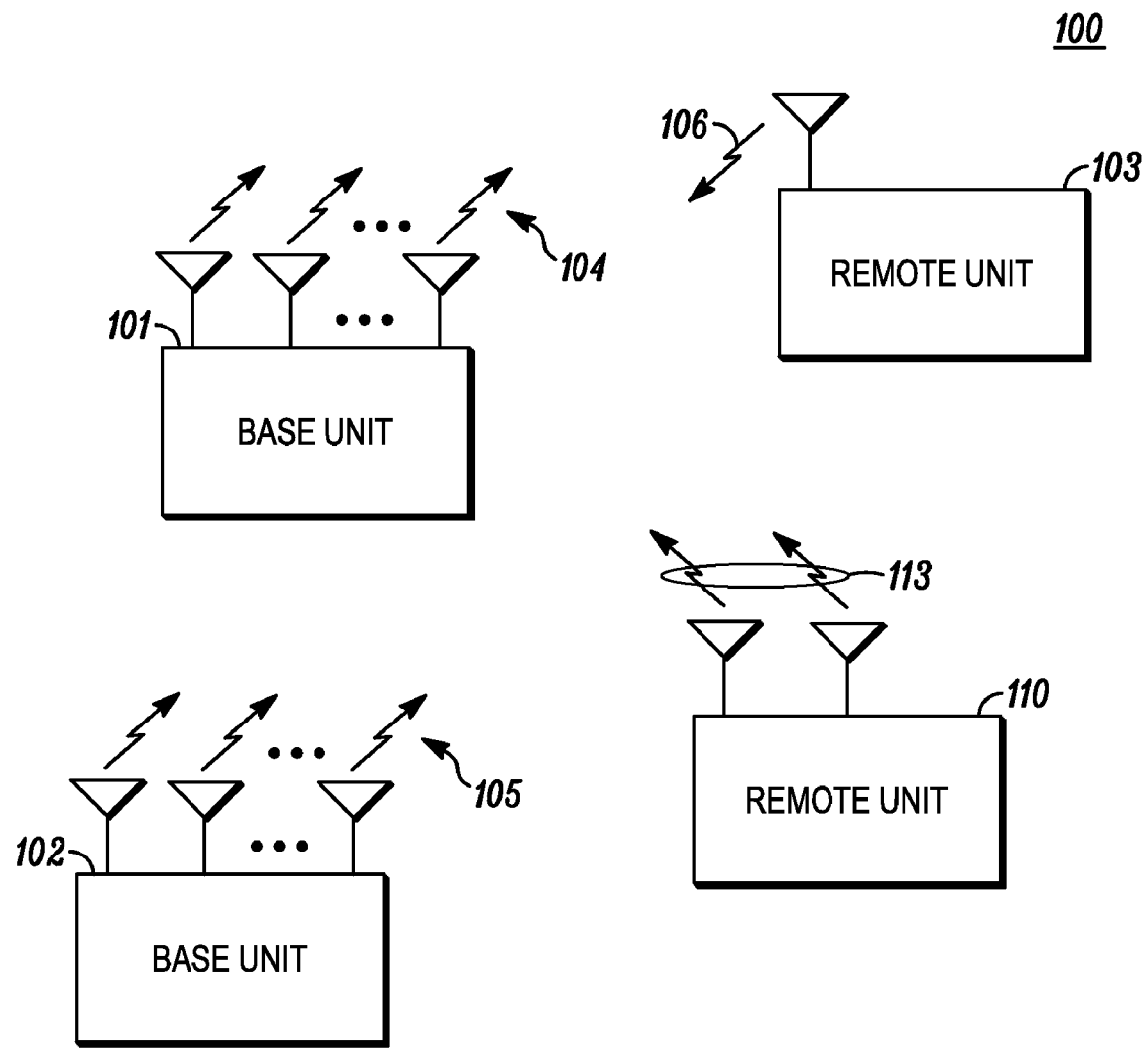
FIG. 1 illustrates a wireless communication system.

In FIG. 1, a wireless communication system 100 comprises one or more fixed base infrastructure units forming a network distributed over a geographical region. The base unit may also be referred to as an access point, access terminal, base, base station, Node-B, eNode-B, eNB or by other terminology used in the art. In FIG. 1, the one or more base units 101 and 102 serve a number of remote units 103 and 110 within a serving area, for example, a cell or a cell sector.

Generally, the base units 101 and 102 transmit downlink communication signals 104 and 105 to serve remote units in the time and/or frequency domain. The remote units 103 and 110 communicate with the one or more base units via uplink communication signals 106 and 113. The one or more base units may comprise one or more transmitters and one or more receivers for downlink and uplink transmissions. The remote units may also comprise one or more transmitters and one or more receivers. The base units are generally part of a radio access network that includes one or more controllers communicably coupled to one or more corresponding base units. The access network is generally communicably coupled to one or more core networks, which may be coupled to other networks, like the Internet and public switched telephone networks, among others. These and other elements of the access and core networks are not illustrated but they are known generally by those having ordinary skill in the art.

Figure 2:
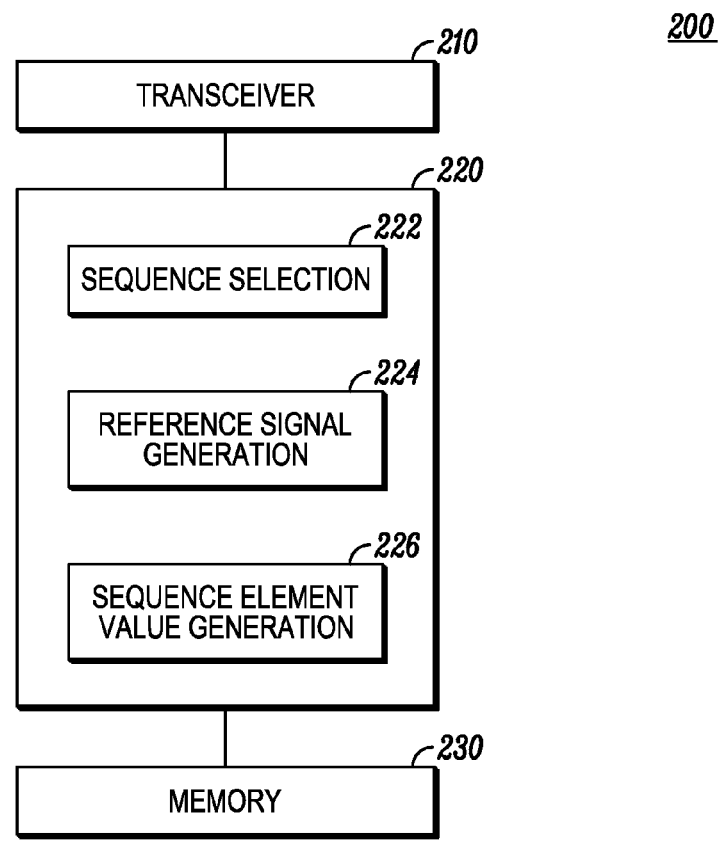
FIG. 2 illustrates a schematic block diagram of a user terminal.

The remote units may be fixed units or mobile terminals. The remote units may also be referred to as subscriber units, mobiles, mobile stations, users, terminals, subscriber stations, user equipment (UE) or by other terminology used in the art. FIG. 2 illustrates a user terminal 200 comprising generally a transceiver 210 that communicates wirelessly with one or more base stations and a controller 220 communicably coupled to the transceiver and to memory 230. The controller may be implemented as a digital signal processor or other suitable processor that implements functionality controlled by software of firmware stored in memory as is known generally by those having ordinary skill in the art.

In one implementation, the wireless communication system is compliant with the developing Long Term Evolution (LTE) of the 3GPP Universal Mobile Telecommunications System (UMTS) protocol, also referred to as EUTRA, wherein the base station transmits using an orthogonal frequency division multiplexing (OFDM) modulation scheme on the downlink and the user terminals transmit on the uplink using a single carrier frequency division multiple access (SC-FDMA) scheme. More generally, however, the wireless communication system may implement some other open or proprietary communication protocol, for example, WiMAX, among other protocols. The present disclosure is not intended to be limited to the implementation of any particular wireless communication system architecture or protocol.

For uplink communications, generally, the user terminal generates a reference signal or pilot waveform based on a selected sequence. The selection of the particular sequence may be based on either an implicit or explicit instruction. For example, in some implementations the sequence is selected based on an identification of the base station with which the user terminal is communicating. Alternatively, the sequence may be selected based on an instruction from the serving base station. In other embodiments, the sequence is selected on some other basis, though the basis for the sequence selection is not particularly relevant and is not intended to limit the claimed subject matter in any way. In FIG. 2, the user terminal and particularly the controller thereof includes functionality 222 for selecting a sequence and functionality 224 for generating a reference signal or pilot waveform based on the selected signal.

In the developing 3GPP Long Term Evolution (LTE) of EUTRA the reference signal or pilot waveform is generated based on a QPSK sequence, and more particularly the reference signal is generated by modulating the selected QPSK sequence on a set of sub-carriers. The members of the set of subcarriers may be adjacent (e.g., localized) or non-adjacent (e.g., distributed). The modulation of sequences on one or more sub-carriers such as the subcarriers of an OFDM modulator is known generally and not discussed further herein. More generally, the reference signal or pilot waveform may be generated based on any constant magnitude modulation format other than QPSK such as BPSK, M-ary PSK.

In some embodiments, the sequences are generated on the user terminal. In the developing 3GPP Long Term Evolution (LTE) of the Universal Mobile Telecommunications System (UMTS), for example, the user terminal will likely generate extended Zadoff-Chu (ZC) sequences for allocations of 3 or more resource blocks. The mechanism required to generate extended ZC sequences is known generally.

According to another aspect of the disclosure, information representative of a plurality of sequences used to generate uplink reference signals or pilot waveforms is stored on the user terminal. Generally each sequence includes a plurality of elements and each element includes a real part and an imaginary part. In one particular implementation, the user terminal stores information representative of a plurality of QPSK sequences. In this implementation, the real part and the imaginary part of each element of each QPSK sequence have values selected from a group of values comprising $+/-1/\sqrt{2}$ (i.e., $+/-0.707$). Generally, the real part and the imaginary part may be scaled by some arbitrary scale factor. In embodiments where other modulation formats are used, the absolute values of the real part and the imaginary part will differ accordingly.

In some embodiments, each element of the sequence includes a phase component. In one implementation, the information stored in memory of the user terminal and representative of the sequence is a phase scaling factor representative of the phase component of each element. In the embodiment where the sequence is a QPSK sequence, the phase component of each element has a value selected from a group of values comprising $+/-\pi/4$ and $+/-3\pi/4$, where $\pi$ is equal to approximately 3.14. According to this embodiment, the phase scaling factor representative of the phase component of each element has a value selected from a group comprising $+/-1$ and $+/-3$. Thus, according to this embodiment, each element of the sequence is of the form $\exp(j*\pi/4*k)$ where k is the phase scaling factor for the element. In other embodiments where the sequence is represented by a phase scaling factor, the scaling factors may have different values depending on the modulation format.

In one implementation, the QPSK sequence is selected from a group of QPSK sequences each of which is represented by elements having 12 phase components with a corresponding scaling factor. The length-12 QPSK sequence may correspond to a single resource block (1 RB) allocation with 12 subcarrriers in 3GPP LTE. According to this embodiment, the information representative of each sequence may require 2 bits per element to represent one of the four possible phase scaling factors requiring a total of 24 bits of memory. The scaling factors for the phase factors are illustrated in Table 1.

TABLE 1

| | | Element Phase Scaling Factors | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| QPSK_Sequences | 1 | −1 | −1 | 1 | −1 | −3 | 1 | 1 | 1 | −3 | 1 | 3 | −1 |
| | 2 | 3 | 3 | 1 | −1 | 3 | 1 | −3 | −3 | −1 | 3 | −1 | 1 |
| | 3 | −3 | 3 | 3 | 1 | −3 | −1 | −1 | 1 | −1 | −1 | 1 | −3 |
| | 4 | 1 | 1 | 1 | 3 | −3 | 1 | −1 | 3 | −1 | −1 | −3 | 3 |
| | 5 | 1 | 3 | 1 | −1 | 1 | 3 | −1 | −1 | −3 | 1 | 3 | 3 |
| | 6 | −3 | 3 | −1 | 3 | 3 | 3 | −3 | 1 | 3 | −1 | −1 | −3 |
| | 7 | −3 | −1 | −3 | −1 | −3 | 3 | 1 | −1 | 1 | 3 | −3 | −3 |
| | 8 | 3 | 3 | −3 | 3 | −3 | 1 | 1 | 3 | −1 | −3 | 3 | 3 |
| | 9 | −1 | −1 | 3 | −1 | 1 | 3 | 1 | −3 | 1 | −1 | −1 | −1 |
| | 10 | −1 | 1 | 1 | 1 | 1 | −1 | −3 | −3 | 1 | −3 | 3 | −1 |
| | 11 | −1 | −1 | −3 | −1 | −1 | −3 | 1 | 3 | 1 | −3 | −1 | −3 |
| | 12 | 3 | −3 | −3 | 1 | −1 | −1 | 3 | 1 | 3 | 1 | 1 | 1 |
| | 13 | 3 | 1 | 3 | 1 | −1 | 1 | 3 | −1 | −1 | 3 | 1 | 3 |
| | 14 | 1 | 3 | 1 | 3 | 1 | −1 | −3 | −1 | 1 | 3 | 1 | −1 |
| | 15 | −1 | 1 | 3 | −3 | 3 | 3 | 1 | 1 | 3 | 1 | −3 | 3 |
| | 16 | −3 | 3 | −1 | 1 | 3 | 1 | −1 | −1 | 1 | 3 | 1 | 1 |
| | 17 | −1 | 3 | −3 | −3 | −3 | 3 | 1 | −1 | 3 | 3 | −3 | 1 |
| | 18 | 3 | −1 | 3 | −3 | 1 | −1 | −3 | −1 | −3 | 3 | 3 | −3 |
| | 19 | 3 | −1 | −3 | −3 | −1 | 3 | −1 | −1 | 1 | −3 | −3 | −3 |
| | 20 | −1 | −3 | 3 | 3 | 3 | −3 | −3 | 1 | −1 | 3 | −1 | 1 |
| | 21 | 1 | −3 | −3 | 3 | −3 | 3 | 1 | −3 | 1 | 3 | 3 | −3 |
| | 22 | −1 | −3 | −3 | −1 | −3 | 3 | −3 | 1 | −1 | −1 | 3 | 3 |
| | 23 | −1 | 1 | 3 | −1 | −3 | −3 | −1 | −1 | −3 | −1 | −3 | 1 |
| | 24 | 1 | −3 | −3 | −1 | −1 | 3 | −1 | 1 | −1 | −3 | −3 | −3 |
| | 25 | −3 | −1 | −1 | 3 | −1 | 3 | −3 | 3 | 1 | 1 | −3 | −3 |
| | 26 | −1 | −1 | −3 | −1 | −3 | −3 | 3 | −1 | −1 | 1 | −3 | 3 |
| | 27 | −3 | 1 | 3 | 3 | −3 | 1 | 1 | −1 | 1 | 1 | −1 | 3 |
| | 28 | −3 | 1 | −1 | −3 | −1 | 3 | 1 | 3 | 3 | 3 | −1 | 1 |
| | 29 | −3 | 3 | 1 | −1 | 1 | −3 | 1 | 3 | −3 | 1 | 1 | 3 |
| | 30 | −1 | −3 | 1 | −1 | −1 | −1 | 3 | −3 | 3 | −3 | 1 | 1 |

In another implementation, the QPSK sequence is selected from a group of QPSK sequences each of which is represented by elements having 24 phase components with corresponding scaling factors. The length-24 QPSK sequence may correspond to a two resource block (2 RB) allocation with 24 subcarrriers in 3GPP LTE. According to this embodiment, the information representative of each sequence may require 2 bits per element to represent one of the four possible phase scaling factors requiring a total of 48 bits of memory. The scaling factors for the phase factors are illustrated in Table 2. In another implementation, information representative of at least the sequences of rows 20, 24 and 26-28 are stored in the memory of the user terminal.

TABLE 2

Element Phase Scaling Factors

| QPSK_Sequences | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| 1 | -3 | 3 | -3 | 3 | 3 | -1 | 3 | 1 | -1 | 3 | -3 | 1 | -1 | 1 | 1 | 3 | 3 | -3 | 1 | -1 | -3 | -3 | 1 | 1 |
| 2 | 1 | -1 | -3 | -1 | -1 | -3 | 3 | 3 | -1 | -3 | -3 | -3 | 1 | 1 | 3 | -3 | 3 | -3 | 3 | -1 | 3 | -3 | -1 | 1 |
| 3 | -1 | -1 | 3 | -1 | 3 | -3 | -1 | -1 | 1 | -1 | -3 | -3 | -3 | -3 | -1 | 1 | -1 | -3 | 1 | 1 | 1 | -1 | 3 | -1 |
| 4 | 3 | 3 | -1 | 3 | 3 | 3 | -3 | 1 | -3 | 1 | 1 | -1 | -1 | -1 | -1 | 3 | 3 | -1 | -3 | -1 | -1 | 1 | -3 | 1 |
| 5 | 1 | 3 | 3 | 3 | 3 | 3 | -1 | -1 | 3 | -1 | 1 | 1 | -1 | -1 | -1 | 1 | 3 | -3 | 3 | 1 | 1 | -1 | 3 | -1 |
| 6 | -1 | -1 | -3 | -3 | 3 | 1 | 3 | -3 | 3 | 1 | -3 | 1 | 1 | 1 | 3 | 3 | -3 | 3 | 1 | -1 | 3 | -3 | -1 |
| 7 | -3 | 1 | 1 | 1 | -1 | 3 | 1 | -3 | 1 | -1 | -1 | -1 | -3 | 1 | 1 | 3 | -3 | 1 | 3 | 1 | 3 | -3 | 1 |
| 8 | 1 | 3 | -3 | -1 | 1 | 3 | 3 | -1 | -1 | -3 | 1 | -3 | 3 | 3 | -1 | -3 | -1 | -3 | 1 | -3 | 3 | 3 | 3 | 1 |
| 9 | -1 | 1 | 1 | -3 | -3 | 1 | -1 | -1 | -1 | 1 | -3 | 3 | -3 | -3 | -3 | -3 | 3 | -3 | -1 | 1 | -1 | 1 | -1 | -3 |
| 10 | 1 | -1 | 1 | 1 | -1 | 3 | 3 | -3 | 3 | 3 | 3 | 1 | 1 | 1 | -3 | 1 | 3 | 1 | -3 | -3 | -1 | 1 | 1 | -3 |
| 11 | -1 | -3 | 1 | 3 | -1 | -3 | -1 | -1 | 3 | 1 | -1 | 1 | 1 | 1 | -1 | 3 | -3 | -1 | -3 | -3 | -1 | 1 | -1 | -3 |
| 12 | -1 | 1 | -3 | 1 | 1 | 3 | -3 | -3 | -3 | 1 | -1 | -3 | 3 | -1 | 1 | 1 | 1 | 1 | -1 | 1 | -1 | -3 | -1 | 3 |
| 13 | 1 | 3 | -3 | -3 | 1 | 1 | 3 | -3 | 1 | 3 | 1 | 3 | -3 | -1 | 1 | -3 | -3 | 1 | -1 | -1 | -3 | -1 | -3 |
| 14 | 3 | 1 | -1 | -1 | 3 | 1 | -1 | 1 | 1 | -3 | 1 | -1 | -1 | 1 | 3 | 3 | 3 | 3 | -1 | 1 | -3 | 1 | -3 |
| 15 | 1 | -3 | -1 | -1 | -3 | -1 | -3 | 3 | -1 | -1 | 3 | -3 | -1 | -3 | -3 | 3 | -1 | 1 | 1 | 3 | 1 | 3 | -1 | -3 |
| 16 | 3 | -3 | -3 | -3 | 1 | -3 | -1 | 1 | -3 | -3 | -1 | -3 | 3 | 1 | -3 | -3 | -3 | 3 | 1 | 3 | 1 | -3 | 1 | 3 |
| 17 | -3 | 1 | 3 | -1 | -3 | -1 | -1 | 3 | 1 | -1 | 1 | 1 | 1 | -1 | 3 | -3 | -1 | -3 | -3 | -1 | 1 | -1 | -3 | -3 |
| 18 | 1 | 1 | -3 | 1 | -1 | -1 | -3 | 3 | -1 | -1 | 1 | -1 | 1 | 1 | -1 | -3 | -1 | 3 | -3 | 1 | 1 | 3 | -3 | -3 |
| 19 | -3 | 3 | 1 | -3 | -3 | -3 | 1 | -3 | -3 | -3 | -1 | 1 | -1 | -3 | 3 | -3 | 3 | 3 | -3 | -1 | 3 | -1 | 1 | 1 |
| 20 | -3 | 3 | 3 | -1 | -1 | -3 | -1 | 3 | 1 | 3 | 1 | 3 | 1 | 1 | -1 | 3 | 1 | -1 | 1 | 3 | -3 | -1 | -1 | 1 |
| 21 | 1 | -1 | 3 | -3 | 3 | 3 | -3 | -1 | -3 | 3 | -1 | 3 | 3 | 1 | -3 | -1 | -3 | -1 | -1 | 3 | 3 | -1 | -1 | 1 |
| 22 | -3 | 1 | 1 | -3 | -1 | -1 | 3 | -1 | 3 | 1 | 3 | 1 | 3 | -1 | 3 | 1 | 3 | -3 | 3 | -3 | 1 | 1 | 1 |
| 23 | -1 | 3 | 1 | 1 | 3 | 1 | -3 | 3 | 3 | 1 | 1 | -3 | 1 | 1 | -3 | -1 | -1 | 1 | 3 | 3 | -3 | 3 | -1 | 1 |
| 24 | -3 | 1 | 1 | 3 | -1 | 1 | 3 | 1 | -3 | 1 | -3 | 1 | 1 | -1 | -1 | 3 | -1 | -3 | 3 | -3 | -3 | -3 | 1 | 1 |
| 25 | -3 | -1 | 1 | 3 | 1 | -1 | -1 | -3 | -1 | -1 | 3 | -1 | -3 | -3 | -3 | -1 | -3 | -1 | 3 | 1 | -1 | 1 | -3 |
| 26 | -3 | -3 | 1 | 1 | -1 | 1 | -1 | 1 | -1 | 3 | 1 | -3 | -1 | 1 | -1 | 1 | -1 | -3 | 3 | -3 | -1 | 1 | -3 |
| 27 | -3 | -1 | -3 | 3 | 1 | -1 | -3 | -1 | -3 | -3 | 3 | -3 | 3 | -3 | -1 | 1 | 3 | 1 | -3 | 1 | 3 | 3 | -1 | -3 |
| 28 | 3 | -1 | 3 | 3 | 1 | 1 | -3 | 3 | 3 | 3 | 3 | 1 | -1 | 3 | -1 | 1 | 1 | -1 | -3 | -1 | -1 | 1 | 3 | 3 |
| 29 | 1 | 1 | 1 | -1 | 1 | -1 | -3 | 3 | -1 | -1 | 1 | -3 | -1 | 1 | 3 | 3 | 3 | -1 | -3 | 1 | 3 | 1 | -3 | -3 |
| 30 | -1 | -3 | 1 | -1 | -3 | -1 | 1 | 3 | 3 | -3 | -3 | 3 | 3 | 1 | 3 | -3 | 3 | -1 | -3 | -1 | 3 | -3 | 3 | 3 |

In an alternative implementation, the information stored in the memory of the user terminal and representative of each sequence is the real part and the imaginary part of the corresponding elements of the sequence. In one implementation, the user terminal selects a QPSK sequence from a group of QPSK sequences each of which is represented by 12 elements having 12 real parts and 12 imaginary parts for an allocation of 1 resource block to the user terminal. According to this embodiment, the information representative of each sequence requires 24 bits of memory. In one embodiment, the real parts of each of the elements of the group of length-12 QPSK sequences are illustrated in Table 3.

TABLE 3

Element Real Parts * √(2)

| QPSK_Sequences | 1 | 2 | 3 | 4 | 5 | 6 | 7 | 8 | 9 | 10 | 11 | 12 |
|---|---|---|---|---|---|---|---|---|---|---|---|---|
| 1 | 1 | 1 | 1 | 1 | -1 | 1 | 1 | 1 | -1 | 1 | -1 | 1 |
| 2 | -1 | -1 | 1 | 1 | -1 | 1 | -1 | -1 | 1 | -1 | 1 | 1 |
| 3 | -1 | -1 | -1 | 1 | -1 | 1 | 1 | 1 | 1 | 1 | 1 | -1 |
| 4 | 1 | 1 | 1 | -1 | -1 | 1 | 1 | -1 | 1 | 1 | -1 | -1 |
| 5 | 1 | -1 | 1 | 1 | 1 | -1 | 1 | 1 | -1 | 1 | -1 | -1 |
| 6 | -1 | -1 | 1 | -1 | -1 | -1 | -1 | 1 | -1 | 1 | 1 | -1 |
| 7 | -1 | 1 | -1 | 1 | -1 | -1 | 1 | 1 | 1 | -1 | -1 | -1 |
| 8 | -1 | -1 | -1 | -1 | -1 | 1 | 1 | -1 | 1 | -1 | -1 | -1 |
| 9 | 1 | 1 | -1 | 1 | 1 | 1 | 1 | -1 | 1 | 1 | 1 | 1 |
| 10 | 1 | 1 | 1 | 1 | 1 | 1 | -1 | -1 | 1 | -1 | -1 | 1 |
| 11 | 1 | 1 | -1 | 1 | 1 | -1 | 1 | -1 | 1 | -1 | 1 | -1 |
| 12 | -1 | -1 | -1 | 1 | 1 | 1 | -1 | 1 | -1 | 1 | 1 | 1 |
| 13 | -1 | 1 | -1 | -1 | 1 | 1 | -1 | 1 | 1 | 1 | 1 | -1 |
| 14 | 1 | -1 | 1 | -1 | 1 | 1 | -1 | 1 | 1 | -1 | 1 | 1 |
| 15 | 1 | 1 | -1 | -1 | -1 | -1 | 1 | 1 | -1 | 1 | -1 | -1 |
| 16 | -1 | -1 | 1 | 1 | -1 | 1 | 1 | 1 | 1 | -1 | 1 | 1 |
| 17 | 1 | -1 | -1 | -1 | -1 | 1 | 1 | 1 | -1 | -1 | 1 | 1 |
| 18 | -1 | 1 | -1 | -1 | 1 | 1 | -1 | -1 | -1 | -1 | 1 | -1 |
| 19 | -1 | 1 | -1 | -1 | 1 | -1 | 1 | -1 | 1 | -1 | -1 | -1 |
| 20 | 1 | -1 | -1 | -1 | -1 | -1 | -1 | 1 | -1 | 1 | 1 | 1 |
| 21 | 1 | -1 | -1 | -1 | -1 | -1 | 1 | -1 | 1 | -1 | -1 | -1 |
| 22 | 1 | -1 | 1 | -1 | -1 | -1 | -1 | 1 | 1 | -1 | -1 | 1 |
| 23 | 1 | 1 | -1 | 1 | -1 | -1 | 1 | -1 | 1 | 1 | -1 | -1 |
| 24 | 1 | -1 | -1 | 1 | -1 | 1 | 1 | 1 | -1 | -1 | -1 | -1 |
| 25 | -1 | 1 | 1 | -1 | 1 | -1 | -1 | -1 | 1 | 1 | -1 | -1 |
| 26 | 1 | 1 | -1 | 1 | -1 | -1 | -1 | 1 | 1 | -1 | 1 | -1 |
| 27 | -1 | 1 | -1 | -1 | -1 | 1 | 1 | 1 | 1 | 1 | 1 | -1 |
| 28 | -1 | 1 | 1 | -1 | 1 | -1 | 1 | -1 | -1 | -1 | 1 | 1 |

TABLE 3-continued

|   | Element Real Parts * √(2) | | | | | | | | | | | |
|---|---|---|---|---|---|---|---|---|---|---|---|---|
|   | 1 | 2 | 3 | 4 | 5 | 6 | 7 | 8 | 9 | 10 | 11 | 12 |
| 29 | -1 | -1 | 1 | 1 | 1 | -1 | 1 | -1 | -1 | 1 | 1 | -1 |
| 30 | 1 | -1 | 1 | 1 | 1 | 1 | -1 | -1 | -1 | -1 | 1 | 1 |

In Table 3, the values for each of the real and imaginary parts are multiplied by √(2). Thus the value of each real part is equivalent to +/−1/√(2), as indicated by the +/− sign in the table. In one embodiment, the imaginary parts of each of the elements of the group of length-12 QPSK sequences are illustrated in Table 4.

TABLE 4

| | | Element Imaginary Parts * √(2) | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| QPSK_Sequences | 1 | -1 | -1 | 1 | -1 | -1 | 1 | 1 | 1 | -1 | 1 | 1 | -1 |
| | 2 | 1 | 1 | 1 | -1 | 1 | 1 | -1 | -1 | -1 | 1 | -1 | 1 |
| | 3 | -1 | 1 | 1 | 1 | -1 | -1 | -1 | 1 | -1 | 1 | -1 | 1 |
| | 4 | 1 | 1 | 1 | 1 | -1 | 1 | -1 | 1 | -1 | -1 | -1 | 1 |
| | 5 | 1 | 1 | 1 | -1 | 1 | 1 | -1 | -1 | -1 | 1 | 1 | 1 |
| | 6 | -1 | 1 | -1 | 1 | 1 | 1 | -1 | 1 | 1 | -1 | -1 | -1 |
| | 7 | -1 | -1 | -1 | -1 | -1 | 1 | 1 | -1 | 1 | 1 | -1 | -1 |
| | 8 | 1 | 1 | -1 | 1 | -1 | 1 | 1 | 1 | -1 | -1 | 1 | 1 |
| | 9 | -1 | -1 | 1 | -1 | 1 | 1 | 1 | -1 | 1 | -1 | -1 | -1 |
| | 10 | -1 | 1 | 1 | 1 | 1 | -1 | -1 | -1 | 1 | -1 | 1 | -1 |
| | 11 | -1 | -1 | -1 | -1 | -1 | -1 | 1 | 1 | 1 | 1 | -1 | -1 |
| | 12 | 1 | -1 | -1 | 1 | -1 | -1 | 1 | 1 | 1 | 1 | 1 | 1 |
| | 13 | 1 | 1 | 1 | 1 | -1 | 1 | 1 | -1 | -1 | 1 | 1 | 1 |
| | 14 | 1 | 1 | 1 | 1 | 1 | -1 | -1 | -1 | 1 | 1 | 1 | -1 |
| | 15 | -1 | 1 | 1 | 1 | -1 | 1 | 1 | 1 | 1 | 1 | 1 | 1 |
| | 16 | -1 | 1 | -1 | 1 | 1 | 1 | -1 | -1 | 1 | 1 | 1 | 1 |
| | 17 | -1 | 1 | -1 | -1 | -1 | 1 | 1 | -1 | 1 | 1 | -1 | 1 |
| | 18 | 1 | -1 | 1 | -1 | 1 | -1 | -1 | -1 | -1 | 1 | 1 | -1 |
| | 19 | 1 | -1 | -1 | -1 | -1 | 1 | -1 | -1 | 1 | -1 | -1 | -1 |
| | 20 | -1 | -1 | 1 | 1 | 1 | -1 | 1 | -1 | 1 | -1 | 1 | -1 |
| | 21 | 1 | -1 | -1 | 1 | -1 | 1 | 1 | -1 | 1 | 1 | 1 | -1 |
| | 22 | -1 | -1 | -1 | -1 | -1 | 1 | -1 | 1 | -1 | -1 | 1 | 1 |
| | 23 | -1 | 1 | 1 | -1 | 1 | -1 | -1 | -1 | -1 | -1 | -1 | 1 |
| | 24 | 1 | -1 | -1 | -1 | -1 | 1 | -1 | 1 | -1 | -1 | -1 | -1 |
| | 25 | -1 | -1 | -1 | 1 | -1 | 1 | -1 | 1 | 1 | 1 | -1 | -1 |
| | 26 | -1 | -1 | -1 | -1 | -1 | -1 | 1 | -1 | -1 | 1 | -1 | 1 |
| | 27 | -1 | 1 | 1 | 1 | 1 | -1 | 1 | 1 | -1 | 1 | -1 | 1 |
| | 28 | -1 | 1 | -1 | -1 | -1 | 1 | 1 | 1 | 1 | 1 | -1 | 1 |
| | 29 | -1 | 1 | 1 | -1 | 1 | -1 | 1 | 1 | -1 | 1 | 1 | 1 |
| | 30 | -1 | -1 | 1 | -1 | -1 | -1 | 1 | -1 | 1 | -1 | 1 | 1 |

In Table 4, the values for each of the real and imaginary parts are multiplied by √(2). Thus the value of each real part is equivalent to +/−1/√(2) as indicated by the +/− sign in the table.

In another implementation where the information stored in memory of the user terminal and representative of the sequence is the real part and the imaginary part of the corresponding elements, the user terminal selects a QPSK sequence from a group of QPSK sequences each of which is represented by 24 elements having 24 real parts and elements having 24 imaginary parts for an allocation of 2 resource blocks to the user terminal. Thus the information representative of each sequence requires 48 bits of memory. In one embodiment, the real parts of each of the elements of the group of length-24 QPSK sequences are illustrated in Table 5.

TABLE 5

| | | Element Real Parts * √(2) | | | | | | | | | | | | | | | | | | | | | | | |
|---|---|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| QPSK_Sequences | 1 | -1 | -1 | -1 | -1 | -1 | 1 | -1 | 1 | 1 | -1 | -1 | 1 | 1 | 1 | 1 | -1 | -1 | -1 | 1 | 1 | -1 | -1 | 1 | 1 |
| | 2 | 1 | 1 | -1 | 1 | 1 | -1 | -1 | -1 | 1 | -1 | -1 | -1 | 1 | 1 | -1 | -1 | -1 | -1 | -1 | 1 | -1 | -1 | 1 | 1 |
| | 3 | 1 | 1 | -1 | 1 | -1 | -1 | 1 | 1 | 1 | 1 | -1 | -1 | -1 | -1 | 1 | 1 | 1 | -1 | 1 | 1 | 1 | 1 | -1 | 1 |
| | 4 | -1 | -1 | 1 | -1 | -1 | -1 | -1 | 1 | -1 | 1 | 1 | 1 | 1 | 1 | 1 | -1 | -1 | 1 | -1 | 1 | 1 | 1 | -1 | 1 |
| | 5 | 1 | -1 | -1 | -1 | -1 | -1 | 1 | 1 | -1 | 1 | 1 | 1 | 1 | 1 | 1 | -1 | -1 | -1 | 1 | 1 | 1 | -1 | 1 | 1 |
| | 6 | 1 | 1 | -1 | -1 | -1 | 1 | -1 | -1 | -1 | 1 | -1 | 1 | 1 | 1 | 1 | -1 | -1 | -1 | 1 | 1 | 1 | -1 | -1 | 1 |
| | 7 | -1 | 1 | 1 | 1 | 1 | -1 | 1 | -1 | 1 | 1 | 1 | 1 | -1 | 1 | 1 | -1 | -1 | 1 | -1 | 1 | -1 | -1 | -1 | 1 |

TABLE 5-continued

| | | | | | | | | | | Element Real Parts * √(2) | | | | | | | | | | | | | |
|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 8 | 1 | -1 | -1 | 1 | 1 | -1 | -1 | 1 | 1 | -1 | 1 | -1 | -1 | -1 | 1 | -1 | 1 | -1 | 1 | -1 | -1 | -1 | -1 | 1 |
| 9 | 1 | 1 | 1 | -1 | -1 | 1 | 1 | 1 | 1 | 1 | -1 | -1 | -1 | -1 | -1 | -1 | -1 | -1 | 1 | 1 | 1 | 1 | 1 | -1 |
| 10 | 1 | 1 | 1 | 1 | 1 | -1 | -1 | -1 | -1 | -1 | -1 | 1 | 1 | 1 | -1 | 1 | -1 | 1 | -1 | -1 | 1 | 1 | 1 | -1 |
| 11 | 1 | -1 | 1 | -1 | 1 | -1 | 1 | 1 | -1 | 1 | 1 | 1 | 1 | 1 | 1 | -1 | -1 | 1 | -1 | -1 | 1 | 1 | 1 | 1 |
| 12 | 1 | 1 | -1 | 1 | 1 | -1 | -1 | -1 | -1 | 1 | 1 | -1 | -1 | 1 | 1 | 1 | 1 | 1 | 1 | 1 | 1 | -1 | 1 | 1 |
| 13 | 1 | -1 | -1 | -1 | 1 | -1 | 1 | 1 | 1 | -1 | 1 | -1 | -1 | -1 | 1 | 1 | -1 | -1 | 1 | 1 | 1 | -1 | 1 | 1 |
| 14 | -1 | 1 | 1 | 1 | -1 | 1 | 1 | 1 | 1 | -1 | 1 | 1 | 1 | 1 | -1 | -1 | -1 | -1 | -1 | 1 | 1 | -1 | 1 | -1 |
| 15 | 1 | -1 | 1 | 1 | -1 | 1 | -1 | -1 | -1 | 1 | -1 | -1 | 1 | -1 | 1 | -1 | 1 | 1 | 1 | -1 | 1 | 1 | 1 | 1 |
| 16 | -1 | -1 | -1 | -1 | 1 | -1 | 1 | 1 | 1 | -1 | 1 | -1 | -1 | 1 | -1 | -1 | -1 | -1 | 1 | -1 | 1 | -1 | 1 | 1 |
| 17 | -1 | 1 | -1 | 1 | -1 | 1 | -1 | 1 | 1 | 1 | 1 | 1 | 1 | -1 | -1 | 1 | -1 | -1 | 1 | 1 | 1 | 1 | -1 | -1 |
| 18 | 1 | 1 | -1 | 1 | 1 | 1 | -1 | -1 | -1 | 1 | 1 | 1 | 1 | 1 | -1 | 1 | -1 | -1 | 1 | 1 | -1 | -1 | -1 | -1 |
| 19 | -1 | -1 | 1 | -1 | -1 | -1 | 1 | -1 | 1 | -1 | 1 | 1 | -1 | -1 | -1 | -1 | -1 | 1 | -1 | 1 | -1 | 1 | 1 | 1 |
| 20 | -1 | -1 | -1 | 1 | 1 | -1 | -1 | -1 | -1 | 1 | 1 | 1 | 1 | -1 | 1 | 1 | 1 | 1 | -1 | 1 | -1 | 1 | 1 | 1 |
| 21 | 1 | 1 | -1 | -1 | -1 | -1 | -1 | -1 | -1 | -1 | 1 | -1 | 1 | -1 | 1 | -1 | 1 | 1 | -1 | -1 | 1 | -1 | 1 | 1 |
| 22 | -1 | 1 | 1 | -1 | 1 | 1 | -1 | 1 | -1 | 1 | -1 | 1 | -1 | 1 | -1 | 1 | -1 | -1 | -1 | -1 | -1 | 1 | 1 | 1 |
| 23 | 1 | -1 | 1 | 1 | -1 | 1 | -1 | -1 | 1 | 1 | 1 | -1 | 1 | 1 | -1 | 1 | 1 | 1 | -1 | -1 | -1 | -1 | 1 | 1 |
| 24 | -1 | 1 | 1 | -1 | 1 | 1 | -1 | 1 | -1 | 1 | -1 | 1 | -1 | 1 | -1 | 1 | -1 | -1 | -1 | -1 | -1 | 1 | 1 | 1 |
| 25 | -1 | 1 | 1 | -1 | 1 | 1 | -1 | 1 | -1 | 1 | -1 | 1 | -1 | 1 | -1 | 1 | -1 | -1 | -1 | -1 | -1 | 1 | 1 | -1 |
| 26 | -1 | -1 | 1 | 1 | 1 | 1 | 1 | 1 | 1 | -1 | 1 | -1 | 1 | 1 | 1 | 1 | 1 | -1 | -1 | -1 | -1 | 1 | 1 | -1 |
| 27 | -1 | 1 | -1 | -1 | 1 | 1 | -1 | 1 | -1 | -1 | -1 | -1 | -1 | 1 | 1 | -1 | 1 | -1 | 1 | -1 | 1 | -1 | 1 | -1 |
| 28 | -1 | 1 | -1 | -1 | 1 | 1 | -1 | -1 | -1 | -1 | -1 | 1 | 1 | -1 | 1 | 1 | 1 | 1 | -1 | 1 | 1 | -1 | -1 | -1 |
| 29 | 1 | 1 | 1 | 1 | 1 | 1 | -1 | -1 | 1 | 1 | -1 | 1 | 1 | -1 | -1 | -1 | 1 | -1 | 1 | -1 | 1 | -1 | 1 | -1 |
| 30 | 1 | -1 | 1 | 1 | -1 | 1 | 1 | -1 | -1 | -1 | -1 | -1 | -1 | 1 | -1 | -1 | -1 | 1 | -1 | 1 | -1 | -1 | -1 | -1 |

In Table 5, the values for each of the real and imaginary parts are multiplied by √(2). Thus the value of each real part is equivalent to +/−1/√(2), as indicated by the +/− sign in the table. In one embodiment, the imaginary parts of each of the elements of the group of length-24 QPSK sequences are illustrated in Table 6.

TABLE 6

| | | | | | | | | | | Element Imaginary Parts * √(2) | | | | | | | | | | | | | | |
|---|---|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| Sequence_Sequences | 1 | -1 | 1 | -1 | 1 | 1 | -1 | 1 | 1 | -1 | 1 | -1 | 1 | -1 | 1 | 1 | 1 | 1 | -1 | 1 | -1 | -1 | -1 | 1 | 1 |
| | 2 | 1 | -1 | -1 | -1 | -1 | -1 | 1 | 1 | -1 | -1 | -1 | -1 | 1 | 1 | 1 | -1 | 1 | -1 | 1 | -1 | 1 | -1 | -1 | 1 |
| | 3 | -1 | -1 | 1 | -1 | 1 | -1 | -1 | -1 | 1 | -1 | -1 | -1 | -1 | -1 | 1 | -1 | -1 | 1 | 1 | 1 | -1 | 1 | -1 |
| | 4 | 1 | 1 | -1 | 1 | 1 | 1 | -1 | 1 | -1 | 1 | -1 | -1 | -1 | -1 | 1 | 1 | -1 | -1 | -1 | -1 | 1 | -1 | 1 |
| | 5 | 1 | 1 | 1 | 1 | 1 | 1 | -1 | -1 | 1 | -1 | 1 | 1 | -1 | -1 | -1 | 1 | -1 | 1 | 1 | 1 | -1 | 1 | -1 |
| | 6 | -1 | -1 | -1 | -1 | 1 | 1 | 1 | -1 | 1 | 1 | -1 | 1 | 1 | 1 | 1 | 1 | -1 | 1 | 1 | -1 | 1 | -1 | -1 |
| | 7 | -1 | 1 | 1 | 1 | -1 | 1 | 1 | -1 | 1 | -1 | -1 | -1 | -1 | 1 | 1 | 1 | 1 | 1 | 1 | 1 | 1 | -1 | 1 |
| | 8 | 1 | 1 | -1 | -1 | 1 | 1 | 1 | 1 | -1 | -1 | 1 | -1 | 1 | 1 | -1 | -1 | -1 | 1 | -1 | 1 | 1 | 1 | 1 |
| | 9 | -1 | 1 | 1 | -1 | -1 | 1 | -1 | 1 | -1 | 1 | -1 | 1 | -1 | -1 | -1 | 1 | -1 | 1 | -1 | 1 | -1 | 1 | -1 | -1 |
| | 10 | 1 | -1 | 1 | 1 | -1 | 1 | 1 | -1 | 1 | 1 | 1 | 1 | 1 | -1 | 1 | 1 | 1 | -1 | -1 | -1 | 1 | 1 | -1 |
| | 11 | -1 | -1 | 1 | 1 | -1 | -1 | -1 | 1 | 1 | -1 | 1 | 1 | 1 | -1 | 1 | -1 | -1 | -1 | -1 | 1 | -1 | 1 | -1 |
| | 12 | -1 | 1 | -1 | 1 | 1 | 1 | -1 | 1 | 1 | -1 | 1 | 1 | -1 | 1 | -1 | 1 | 1 | 1 | -1 | 1 | -1 | -1 | -1 | 1 |
| | 13 | 1 | 1 | -1 | -1 | 1 | 1 | 1 | 1 | 1 | -1 | 1 | 1 | 1 | 1 | 1 | 1 | -1 | 1 | 1 | -1 | -1 | -1 | -1 | 1 |
| | 14 | 1 | 1 | -1 | -1 | 1 | 1 | -1 | 1 | 1 | -1 | 1 | -1 | 1 | -1 | 1 | 1 | 1 | 1 | -1 | 1 | -1 | 1 | -1 | 1 |
| | 15 | 1 | -1 | -1 | -1 | -1 | -1 | 1 | -1 | -1 | 1 | -1 | -1 | 1 | -1 | -1 | 1 | 1 | 1 | 1 | 1 | 1 | -1 | -1 |
| | 16 | 1 | -1 | -1 | 1 | 1 | -1 | 1 | 1 | -1 | -1 | -1 | 1 | 1 | 1 | 1 | 1 | 1 | 1 | -1 | 1 | -1 | 1 | 1 |
| | 17 | -1 | 1 | 1 | -1 | -1 | -1 | 1 | 1 | 1 | 1 | -1 | 1 | -1 | -1 | -1 | 1 | -1 | -1 | -1 | -1 | -1 | 1 | -1 |
| | 18 | 1 | 1 | -1 | 1 | -1 | -1 | 1 | 1 | 1 | -1 | 1 | 1 | 1 | -1 | -1 | 1 | 1 | 1 | 1 | 1 | -1 | 1 |
| | 19 | -1 | 1 | 1 | -1 | -1 | 1 | 1 | -1 | -1 | -1 | 1 | -1 | 1 | -1 | 1 | 1 | 1 | -1 | 1 | -1 | 1 | -1 | 1 | 1 |
| | 20 | -1 | 1 | 1 | -1 | -1 | -1 | -1 | 1 | 1 | 1 | 1 | 1 | 1 | -1 | 1 | 1 | 1 | 1 | 1 | -1 | -1 | -1 | 1 | 1 |
| | 21 | 1 | -1 | 1 | 1 | -1 | 1 | -1 | 1 | -1 | 1 | 1 | 1 | 1 | 1 | 1 | -1 | 1 | 1 | 1 | 1 | -1 | 1 | 1 |
| | 22 | -1 | 1 | 1 | -1 | -1 | 1 | -1 | 1 | 1 | 1 | 1 | -1 | 1 | -1 | 1 | 1 | -1 | 1 | -1 | 1 | 1 | 1 |
| | 23 | -1 | 1 | 1 | 1 | 1 | 1 | -1 | 1 | 1 | 1 | -1 | 1 | -1 | 1 | -1 | -1 | 1 | 1 | 1 | 1 | -1 | 1 |
| | 24 | -1 | 1 | 1 | -1 | 1 | 1 | 1 | 1 | -1 | 1 | 1 | 1 | 1 | -1 | -1 | 1 | -1 | 1 | -1 | -1 | -1 | 1 | 1 |
| | 25 | -1 | -1 | 1 | 1 | -1 | -1 | -1 | -1 | -1 | 1 | -1 | 1 | 1 | 1 | -1 | -1 | 1 | 1 | 1 | 1 | -1 | 1 | 1 | -1 |
| | 26 | -1 | -1 | 1 | -1 | 1 | -1 | -1 | 1 | 1 | -1 | 1 | -1 | 1 | 1 | -1 | 1 | 1 | -1 | 1 | -1 | 1 | -1 | -1 |
| | 27 | -1 | -1 | -1 | 1 | 1 | -1 | -1 | -1 | 1 | 1 | -1 | -1 | 1 | -1 | 1 | -1 | 1 | 1 | 1 | 1 | 1 | -1 | -1 |
| | 28 | 1 | -1 | 1 | 1 | 1 | 1 | -1 | 1 | 1 | 1 | -1 | 1 | -1 | 1 | 1 | 1 | -1 | -1 | -1 | -1 | 1 | 1 | 1 |
| | 29 | 1 | 1 | 1 | -1 | 1 | -1 | 1 | 1 | -1 | 1 | -1 | 1 | 1 | 1 | 1 | 1 | -1 | 1 | 1 | 1 | 1 | -1 | 1 |
| | 30 | -1 | -1 | 1 | -1 | -1 | -1 | 1 | 1 | 1 | -1 | 1 | 1 | 1 | 1 | -1 | 1 | -1 | 1 | -1 | -1 | 1 | -1 | 1 | 1 |

In Table 6, the values for each of the real and imaginary parts are multiplied by √(2). Thus the value of each real part is equivalent to +/−1/√(2) as indicated by the +/− sign in the table. In another implementation, information representative of at least the sequences of rows 20, 24 and 26-28 are stored in the memory of the user terminal.

In an alternative implementation, the information stored in memory of the user terminal and representative of the sequence is a first bit corresponding to the real part of each element and a second bit corresponding to the imaginary part of each element. For the exemplary case where the sequences are QPSK, the first bit has a value that corresponds to $+/-1/\sqrt{2}$ and the second bit has a value that corresponds to $+/-1/\sqrt{2}$. Tables 7 and 8 illustrate exemplary first and second bits for the real and imaginary parts of each element for the single resource block (1 RB) allocation case. In Tables 7 and 8, a bit value of "0" corresponds to $+1/\sqrt{2}$ and a bit value of "1" corresponds to $-1/\sqrt{2}$. Alternatively, a bit value of "0" may corresponds to $-1/\sqrt{2}$ and a bit value of "0" may corresponds to $+1/\sqrt{2}$.

TABLE 7

Element Real Part (First Bits)

| QPSK_Sequence | | 1 | 2 | 3 | 4 | 5 | 6 | 7 | 8 | 9 | 10 | 11 | 12 |
|---|---|---|---|---|---|---|---|---|---|---|---|---|---|
| | 1 | 0 | 0 | 0 | 0 | 1 | 0 | 0 | 0 | 1 | 0 | 1 | 0 |
| | 2 | 1 | 1 | 0 | 0 | 1 | 0 | 1 | 1 | 0 | 1 | 0 | 0 |
| | 3 | 1 | 1 | 1 | 0 | 1 | 0 | 0 | 0 | 0 | 0 | 0 | 1 |
| | 4 | 0 | 0 | 0 | 1 | 1 | 0 | 0 | 1 | 0 | 0 | 1 | 1 |
| | 5 | 0 | 1 | 0 | 0 | 0 | 1 | 0 | 0 | 1 | 0 | 1 | 1 |
| | 6 | 1 | 1 | 0 | 1 | 1 | 1 | 1 | 0 | 1 | 0 | 0 | 1 |
| | 7 | 1 | 0 | 1 | 0 | 1 | 1 | 0 | 0 | 0 | 1 | 1 | 1 |
| | 8 | 1 | 1 | 1 | 1 | 1 | 0 | 0 | 1 | 0 | 1 | 1 | 1 |
| | 9 | 0 | 0 | 1 | 0 | 0 | 1 | 0 | 1 | 0 | 0 | 0 | 0 |
| | 10 | 0 | 0 | 0 | 0 | 0 | 0 | 1 | 1 | 0 | 1 | 1 | 0 |
| | 11 | 0 | 0 | 1 | 0 | 0 | 1 | 0 | 1 | 0 | 1 | 0 | 1 |
| | 12 | 1 | 1 | 1 | 0 | 0 | 0 | 1 | 0 | 1 | 0 | 0 | 0 |
| | 13 | 1 | 0 | 1 | 0 | 0 | 0 | 1 | 0 | 0 | 1 | 0 | 1 |
| | 14 | 0 | 1 | 0 | 1 | 0 | 0 | 1 | 0 | 0 | 1 | 0 | 0 |
| | 15 | 0 | 0 | 1 | 1 | 1 | 1 | 0 | 0 | 1 | 0 | 1 | 1 |
| | 16 | 1 | 1 | 0 | 0 | 1 | 0 | 0 | 0 | 0 | 1 | 0 | 0 |
| | 17 | 0 | 1 | 1 | 1 | 1 | 1 | 0 | 0 | 1 | 1 | 1 | 0 |
| | 18 | 1 | 0 | 1 | 1 | 0 | 0 | 1 | 0 | 1 | 1 | 1 | 1 |
| | 19 | 1 | 0 | 1 | 1 | 0 | 1 | 0 | 0 | 0 | 1 | 1 | 1 |
| | 20 | 0 | 1 | 1 | 1 | 1 | 1 | 1 | 0 | 0 | 1 | 0 | 0 |
| | 21 | 0 | 1 | 1 | 1 | 1 | 1 | 0 | 1 | 0 | 1 | 1 | 1 |
| | 22 | 0 | 1 | 1 | 0 | 1 | 1 | 1 | 0 | 0 | 0 | 1 | 1 |
| | 23 | 0 | 0 | 1 | 0 | 1 | 1 | 0 | 0 | 1 | 0 | 1 | 0 |
| | 24 | 0 | 1 | 1 | 0 | 0 | 1 | 0 | 0 | 0 | 1 | 1 | 1 |
| | 25 | 1 | 0 | 0 | 1 | 0 | 1 | 1 | 1 | 0 | 0 | 1 | 1 |
| | 26 | 0 | 0 | 1 | 0 | 1 | 1 | 1 | 0 | 0 | 0 | 1 | 1 |
| | 27 | 1 | 0 | 1 | 1 | 1 | 0 | 0 | 0 | 0 | 0 | 0 | 1 |
| | 28 | 1 | 0 | 0 | 1 | 0 | 1 | 0 | 1 | 1 | 1 | 0 | 0 |
| | 29 | 1 | 1 | 0 | 0 | 0 | 1 | 0 | 1 | 1 | 0 | 0 | 1 |
| | 30 | 0 | 1 | 0 | 0 | 0 | 0 | 1 | 1 | 1 | 1 | 0 | 0 |

TABLE 8

Element Imaginary Part (Second Bits)

| QPSK_Sequence | | 1 | 2 | 3 | 4 | 5 | 6 | 7 | 8 | 9 | 10 | 11 | 12 |
|---|---|---|---|---|---|---|---|---|---|---|---|---|---|
| | 1 | 1 | 1 | 0 | 1 | 1 | 0 | 0 | 0 | 1 | 0 | 0 | 1 |
| | 2 | 0 | 0 | 0 | 1 | 0 | 1 | 1 | 1 | 1 | 0 | 1 | 0 |
| | 3 | 1 | 0 | 0 | 0 | 1 | 1 | 1 | 0 | 1 | 1 | 0 | 1 |
| | 4 | 0 | 0 | 0 | 0 | 1 | 0 | 1 | 0 | 1 | 1 | 1 | 0 |
| | 5 | 0 | 0 | 0 | 1 | 0 | 0 | 1 | 1 | 1 | 0 | 0 | 0 |
| | 6 | 1 | 0 | 1 | 0 | 0 | 0 | 1 | 0 | 0 | 1 | 1 | 1 |
| | 7 | 1 | 1 | 1 | 1 | 1 | 0 | 0 | 1 | 0 | 0 | 1 | 1 |
| | 8 | 0 | 0 | 1 | 0 | 1 | 0 | 0 | 0 | 1 | 1 | 0 | 0 |
| | 9 | 1 | 1 | 0 | 1 | 0 | 0 | 0 | 1 | 0 | 1 | 1 | 1 |
| | 10 | 1 | 0 | 0 | 0 | 0 | 1 | 1 | 1 | 0 | 1 | 0 | 1 |
| | 11 | 1 | 1 | 1 | 1 | 1 | 1 | 0 | 0 | 0 | 1 | 1 | 1 |
| | 12 | 0 | 1 | 1 | 0 | 1 | 1 | 0 | 0 | 0 | 0 | 0 | 0 |
| | 13 | 0 | 0 | 0 | 0 | 1 | 0 | 0 | 1 | 1 | 0 | 0 | 0 |
| | 14 | 0 | 0 | 0 | 0 | 0 | 1 | 1 | 1 | 0 | 0 | 0 | 1 |
| | 15 | 1 | 0 | 0 | 1 | 0 | 0 | 0 | 0 | 0 | 0 | 1 | 0 |
| | 16 | 1 | 0 | 1 | 0 | 0 | 0 | 1 | 1 | 0 | 0 | 0 | 0 |
| | 17 | 1 | 0 | 1 | 1 | 1 | 0 | 0 | 1 | 0 | 0 | 1 | 0 |
| | 18 | 0 | 1 | 0 | 1 | 0 | 1 | 1 | 1 | 1 | 0 | 0 | 1 |
| | 19 | 0 | 1 | 1 | 1 | 1 | 0 | 1 | 0 | 1 | 1 | 1 | 1 |
| | 20 | 1 | 1 | 0 | 0 | 0 | 1 | 1 | 0 | 1 | 0 | 1 | 0 |
| | 21 | 0 | 1 | 1 | 0 | 1 | 0 | 0 | 1 | 0 | 0 | 0 | 1 |
| | 22 | 1 | 1 | 1 | 1 | 1 | 0 | 1 | 0 | 1 | 1 | 0 | 0 |
| | 23 | 1 | 0 | 0 | 1 | 1 | 1 | 1 | 1 | 1 | 1 | 1 | 0 |
| | 24 | 0 | 1 | 1 | 1 | 1 | 0 | 1 | 0 | 1 | 1 | 1 | 1 |
| | 25 | 1 | 1 | 1 | 0 | 1 | 0 | 1 | 0 | 0 | 0 | 1 | 1 |
| | 26 | 1 | 1 | 1 | 1 | 1 | 1 | 0 | 1 | 0 | 1 | 0 | 0 |
| | 27 | 1 | 0 | 0 | 0 | 1 | 0 | 0 | 1 | 0 | 0 | 1 | 0 |

TABLE 8-continued

| | Element Imaginary Part (Second Bits) | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 28 | 1 | 0 | 1 | 1 | 1 | 0 | 0 | 0 | 0 | 0 | 1 | 0 |
| 29 | 1 | 0 | 0 | 1 | 0 | 1 | 0 | 0 | 1 | 0 | 0 | 0 |
| 30 | 1 | 1 | 0 | 1 | 1 | 1 | 0 | 1 | 0 | 1 | 0 | 0 |

Tables 9 and 10 illustrate exemplary first and second bits for the real and imaginary parts of each element for a 2 RB allocation case. In Tables 9 and 10, a bit value of "0" corresponds to $+1/\sqrt{2}$ and a bit value of "1" corresponds to $-1/\sqrt{2}$. Alternatively, a bit value of "0" may corresponds to $-1/\sqrt{2}$ and a bit value of "0" may corresponds to $+1/\sqrt{2}$. In another implementation, information representative of at least the sequences of rows 20, 24 and 26-28 are stored in the memory of the user terminal.

TABLE 9

| | | Element Real Part (First Bits) | | | | | | | | | | | | | | | | | | | | | | | |
|---|---|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| QPSK_Sequences | 1 | 1 | 1 | 1 | 1 | 1 | 0 | 1 | 0 | 0 | 1 | 1 | 0 | 0 | 0 | 0 | 1 | 1 | 1 | 0 | 0 | 1 | 1 | 0 | 0 |
| | 2 | 0 | 0 | 0 | 1 | 0 | 0 | 1 | 1 | 1 | 0 | 1 | 1 | 1 | 0 | 0 | 1 | 1 | 1 | 1 | 1 | 0 | 1 | 1 | 0 | 0 |
| | 3 | 0 | 0 | 1 | 0 | 1 | 1 | 0 | 0 | 0 | 0 | 1 | 1 | 1 | 1 | 0 | 0 | 0 | 1 | 0 | 0 | 0 | 0 | 1 | 0 |
| | 4 | 1 | 1 | 0 | 1 | 1 | 1 | 1 | 0 | 1 | 0 | 0 | 0 | 0 | 0 | 0 | 1 | 1 | 0 | 1 | 0 | 0 | 0 | 1 | 0 |
| | 5 | 0 | 1 | 1 | 1 | 1 | 1 | 0 | 0 | 1 | 0 | 0 | 0 | 0 | 0 | 0 | 0 | 1 | 1 | 1 | 0 | 0 | 0 | 1 | 0 |
| | 6 | 0 | 0 | 1 | 1 | 1 | 0 | 1 | 1 | 1 | 0 | 1 | 0 | 0 | 0 | 0 | 1 | 1 | 1 | 1 | 0 | 0 | 1 | 1 | 0 |
| | 7 | 1 | 0 | 0 | 0 | 0 | 1 | 0 | 1 | 0 | 0 | 0 | 0 | 0 | 1 | 0 | 0 | 1 | 1 | 0 | 1 | 0 | 1 | 1 | 0 |
| | 8 | 0 | 1 | 1 | 0 | 0 | 1 | 1 | 0 | 0 | 1 | 0 | 1 | 1 | 1 | 0 | 1 | 0 | 1 | 0 | 1 | 1 | 1 | 1 | 0 |
| | 9 | 0 | 0 | 0 | 1 | 1 | 0 | 0 | 0 | 0 | 0 | 1 | 1 | 1 | 1 | 1 | 1 | 1 | 1 | 0 | 0 | 0 | 0 | 0 | 1 |
| | 10 | 0 | 0 | 0 | 0 | 0 | 1 | 1 | 1 | 1 | 1 | 1 | 0 | 0 | 0 | 1 | 0 | 1 | 0 | 1 | 1 | 0 | 0 | 0 | 1 |
| | 11 | 0 | 1 | 0 | 1 | 0 | 1 | 0 | 0 | 0 | 0 | 0 | 0 | 0 | 0 | 1 | 1 | 0 | 1 | 1 | 0 | 0 | 0 | 1 | 0 | 1 |
| | 12 | 0 | 0 | 1 | 0 | 0 | 1 | 1 | 1 | 1 | 0 | 0 | 1 | 1 | 0 | 0 | 0 | 0 | 0 | 0 | 0 | 0 | 1 | 0 | 1 |
| | 13 | 0 | 1 | 1 | 1 | 0 | 1 | 0 | 0 | 1 | 1 | 0 | 1 | 1 | 1 | 0 | 0 | 1 | 1 | 0 | 0 | 0 | 1 | 0 | 1 |
| | 14 | 1 | 0 | 0 | 0 | 1 | 0 | 0 | 0 | 0 | 1 | 0 | 0 | 0 | 0 | 1 | 1 | 1 | 1 | 1 | 0 | 0 | 1 | 0 | 1 |
| | 15 | 0 | 1 | 0 | 0 | 0 | 1 | 0 | 1 | 1 | 0 | 0 | 1 | 1 | 0 | 1 | 1 | 0 | 0 | 0 | 1 | 0 | 1 | 0 | 1 |
| | 16 | 1 | 1 | 1 | 1 | 0 | 1 | 0 | 0 | 1 | 1 | 0 | 1 | 1 | 0 | 1 | 1 | 1 | 1 | 0 | 1 | 0 | 1 | 0 | 1 |
| | 17 | 1 | 0 | 1 | 0 | 1 | 0 | 0 | 1 | 0 | 0 | 0 | 0 | 0 | 0 | 1 | 1 | 0 | 1 | 1 | 0 | 0 | 0 | 1 | 1 |
| | 18 | 0 | 0 | 1 | 0 | 0 | 0 | 1 | 1 | 0 | 0 | 0 | 0 | 0 | 0 | 1 | 0 | 1 | 1 | 1 | 0 | 0 | 1 | 1 | 1 |
| | 19 | 1 | 1 | 0 | 1 | 1 | 1 | 0 | 1 | 1 | 1 | 0 | 0 | 0 | 1 | 1 | 1 | 1 | 1 | 1 | 0 | 1 | 0 | 0 | 0 |
| | 20 | 1 | 1 | 1 | 0 | 0 | 1 | 0 | 1 | 0 | 1 | 0 | 1 | 0 | 0 | 0 | 1 | 0 | 0 | 0 | 1 | 1 | 1 | 0 | 0 | 0 |
| | 21 | 0 | 0 | 1 | 1 | 1 | 1 | 0 | 1 | 1 | 1 | 0 | 1 | 1 | 0 | 1 | 0 | 1 | 0 | 0 | 1 | 1 | 0 | 0 | 0 |
| | 22 | 1 | 0 | 0 | 1 | 0 | 0 | 1 | 0 | 1 | 0 | 1 | 0 | 1 | 0 | 1 | 1 | 0 | 1 | 1 | 1 | 1 | 0 | 0 | 0 |
| | 23 | 0 | 1 | 0 | 0 | 1 | 0 | 1 | 1 | 1 | 0 | 0 | 1 | 0 | 0 | 1 | 0 | 0 | 0 | 1 | 1 | 1 | 1 | 0 | 0 |
| | 24 | 1 | 0 | 0 | 1 | 0 | 0 | 1 | 0 | 1 | 0 | 1 | 0 | 0 | 0 | 1 | 0 | 1 | 1 | 1 | 1 | 1 | 0 | 0 | 0 |
| | 25 | 1 | 0 | 0 | 1 | 0 | 0 | 0 | 1 | 0 | 0 | 1 | 0 | 0 | 1 | 1 | 1 | 0 | 1 | 0 | 1 | 0 | 0 | 0 | 1 |
| | 26 | 1 | 1 | 0 | 0 | 0 | 0 | 0 | 0 | 0 | 1 | 0 | 1 | 0 | 0 | 0 | 0 | 0 | 0 | 1 | 1 | 1 | 0 | 0 | 1 |
| | 27 | 1 | 0 | 1 | 1 | 0 | 0 | 1 | 0 | 1 | 1 | 1 | 1 | 1 | 1 | 0 | 0 | 1 | 0 | 1 | 0 | 1 | 1 | 0 | 1 |
| | 28 | 1 | 0 | 1 | 1 | 0 | 0 | 1 | 1 | 1 | 1 | 1 | 0 | 0 | 1 | 0 | 0 | 0 | 0 | 1 | 0 | 0 | 0 | 1 | 1 |
| | 29 | 0 | 0 | 0 | 0 | 0 | 0 | 1 | 1 | 0 | 0 | 0 | 1 | 0 | 0 | 1 | 1 | 1 | 0 | 1 | 0 | 1 | 0 | 1 | 1 |
| | 30 | 0 | 1 | 0 | 0 | 1 | 0 | 0 | 1 | 1 | 1 | 1 | 1 | 1 | 0 | 1 | 1 | 1 | 0 | 1 | 0 | 1 | 1 | 1 | 1 |

TABLE 10

| | | Element Imaginary Part (Second Bits) | | | | | | | | | | | | | | | | | | | | | | | |
|---|---|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| QPSK_Sequences | 1 | 1 | 0 | 1 | 0 | 0 | 1 | 0 | 0 | 1 | 0 | 1 | 0 | 1 | 0 | 0 | 0 | 0 | 1 | 0 | 1 | 1 | 1 | 0 | 0 |
| | 2 | 0 | 1 | 1 | 1 | 1 | 1 | 0 | 0 | 1 | 1 | 1 | 1 | 0 | 0 | 0 | 1 | 0 | 1 | 0 | 1 | 0 | 1 | 1 | 0 |
| | 3 | 1 | 1 | 0 | 1 | 0 | 1 | 1 | 1 | 0 | 1 | 1 | 1 | 1 | 1 | 0 | 1 | 1 | 0 | 0 | 0 | 1 | 0 | 1 |
| | 4 | 0 | 0 | 0 | 1 | 0 | 0 | 1 | 1 | 0 | 0 | 1 | 1 | 1 | 0 | 0 | 1 | 1 | 1 | 1 | 0 | 1 | 0 |
| | 5 | 0 | 0 | 0 | 0 | 0 | 1 | 1 | 0 | 1 | 0 | 0 | 1 | 1 | 1 | 0 | 0 | 1 | 0 | 0 | 0 | 1 | 0 | 1 |
| | 6 | 1 | 1 | 1 | 1 | 0 | 0 | 0 | 1 | 0 | 0 | 1 | 0 | 0 | 0 | 0 | 0 | 0 | 1 | 0 | 0 | 1 | 0 | 1 | 1 |
| | 7 | 1 | 0 | 0 | 0 | 1 | 0 | 0 | 1 | 0 | 1 | 1 | 1 | 1 | 0 | 0 | 0 | 1 | 0 | 0 | 0 | 0 | 1 | 0 |
| | 8 | 0 | 0 | 1 | 1 | 0 | 0 | 0 | 1 | 1 | 0 | 1 | 0 | 0 | 1 | 1 | 1 | 1 | 0 | 1 | 0 | 0 | 0 | 0 |
| | 9 | 1 | 0 | 0 | 1 | 1 | 0 | 1 | 1 | 1 | 0 | 1 | 0 | 1 | 1 | 1 | 0 | 1 | 1 | 0 | 1 | 0 | 1 | 1 |
| | 10 | 0 | 1 | 0 | 0 | 1 | 0 | 0 | 1 | 0 | 0 | 0 | 0 | 0 | 1 | 0 | 0 | 0 | 1 | 1 | 1 | 0 | 0 | 1 |
| | 11 | 1 | 1 | 0 | 0 | 1 | 1 | 1 | 1 | 0 | 1 | 0 | 0 | 0 | 1 | 0 | 1 | 1 | 1 | 1 | 1 | 0 | 1 | 1 |
| | 12 | 0 | 0 | 1 | 1 | 0 | 0 | 1 | 1 | 1 | 0 | 1 | 0 | 1 | 0 | 0 | 0 | 0 | 1 | 0 | 1 | 1 | 1 | 0 |
| | 13 | 0 | 0 | 0 | 1 | 1 | 0 | 0 | 0 | 0 | 0 | 1 | 0 | 0 | 1 | 0 | 1 | 1 | 0 | 1 | 1 | 1 | 1 | 1 |
| | 14 | 0 | 0 | 1 | 1 | 0 | 0 | 1 | 0 | 0 | 1 | 0 | 1 | 0 | 0 | 0 | 0 | 0 | 1 | 1 | 1 | 0 | 1 |
| | 15 | 0 | 1 | 1 | 1 | 1 | 1 | 0 | 1 | 0 | 1 | 0 | 1 | 1 | 1 | 0 | 1 | 0 | 0 | 0 | 0 | 0 | 1 | 1 |
| | 16 | 0 | 1 | 1 | 1 | 0 | 1 | 1 | 0 | 1 | 0 | 1 | 1 | 0 | 0 | 1 | 1 | 0 | 0 | 0 | 0 | 0 | 1 | 0 | 0 |
| | 17 | 1 | 0 | 0 | 1 | 1 | 1 | 1 | 0 | 0 | 1 | 0 | 0 | 0 | 1 | 0 | 1 | 1 | 1 | 1 | 1 | 0 | 1 | 1 |

TABLE 10-continued

Element Imaginary Part (Second Bits)

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| 18 | 0 | 0 | 1 | 0 | 1 | 1 | 1 | 0 | 1 | 1 | 0 | 1 | 0 | 0 | 1 | 1 | 1 | 0 | 1 | 0 | 0 | 0 | 1 | 1 |
| 19 | 1 | 0 | 0 | 1 | 1 | 1 | 0 | 1 | 1 | 1 | 1 | 0 | 1 | 1 | 0 | 1 | 0 | 0 | 1 | 1 | 0 | 1 | 0 | 0 |
| 20 | 1 | 0 | 0 | 1 | 1 | 1 | 1 | 0 | 0 | 0 | 0 | 0 | 0 | 0 | 1 | 0 | 0 | 1 | 0 | 0 | 1 | 1 | 1 | 0 |
| 21 | 0 | 1 | 0 | 1 | 0 | 0 | 1 | 1 | 0 | 1 | 0 | 0 | 0 | 0 | 1 | 1 | 1 | 1 | 1 | 0 | 0 | 1 | 1 | 0 |
| 22 | 1 | 0 | 0 | 1 | 1 | 1 | 0 | 1 | 0 | 0 | 0 | 0 | 0 | 1 | 0 | 0 | 0 | 0 | 1 | 0 | 1 | 0 | 0 | 0 |
| 23 | 1 | 0 | 0 | 0 | 0 | 0 | 1 | 0 | 0 | 0 | 0 | 1 | 0 | 0 | 1 | 1 | 1 | 0 | 0 | 0 | 1 | 0 | 1 | 0 |
| 24 | 1 | 0 | 0 | 0 | 1 | 0 | 0 | 0 | 1 | 0 | 1 | 0 | 0 | 1 | 1 | 0 | 1 | 1 | 0 | 1 | 1 | 1 | 0 | 0 |
| 25 | 1 | 1 | 0 | 0 | 0 | 1 | 1 | 1 | 1 | 1 | 1 | 0 | 1 | 1 | 0 | 1 | 1 | 1 | 1 | 0 | 0 | 1 | 0 | 1 |
| 26 | 1 | 1 | 0 | 0 | 1 | 0 | 1 | 0 | 1 | 0 | 0 | 1 | 1 | 0 | 1 | 0 | 1 | 1 | 0 | 0 | 1 | 1 | 0 | 1 |
| 27 | 1 | 1 | 1 | 0 | 0 | 1 | 1 | 1 | 1 | 1 | 0 | 1 | 0 | 1 | 1 | 0 | 0 | 0 | 1 | 0 | 0 | 0 | 1 | 1 |
| 28 | 0 | 1 | 0 | 0 | 0 | 0 | 1 | 0 | 0 | 0 | 0 | 0 | 1 | 0 | 1 | 0 | 0 | 1 | 1 | 1 | 1 | 0 | 0 | 0 |
| 29 | 0 | 0 | 0 | 1 | 0 | 1 | 1 | 0 | 1 | 1 | 0 | 1 | 1 | 0 | 0 | 0 | 1 | 1 | 0 | 0 | 0 | 0 | 1 | 1 |
| 30 | 1 | 1 | 0 | 1 | 1 | 1 | 0 | 0 | 0 | 1 | 1 | 0 | 0 | 0 | 0 | 1 | 0 | 1 | 1 | 1 | 0 | 1 | 0 | 0 |

Storing information representative of the sequences eliminates the requirement that the user terminal generates sequences and may reduce memory requirements. In some embodiments, the user terminal generates some sequences and uses stored information representative of other sequences. In other embodiments however, the terminal may generate all of the sequences. In the developing 3GPP LTE UMTS protocol, for example, the user terminal will likely generate extended Zadoff-Chu (ZC) sequences for allocations of 3 or more uplink resource blocks and use pre-stored information representative of a plurality of sequences for allocations of less than 3 uplink resource blocks. Generally, any of the sequences may be scaled by some arbitrary scale factor with an arbitrary phase such as −1 or +/−j and/or be cyclically time shifted by an arbitrary cyclic shift value.

Figure 3:
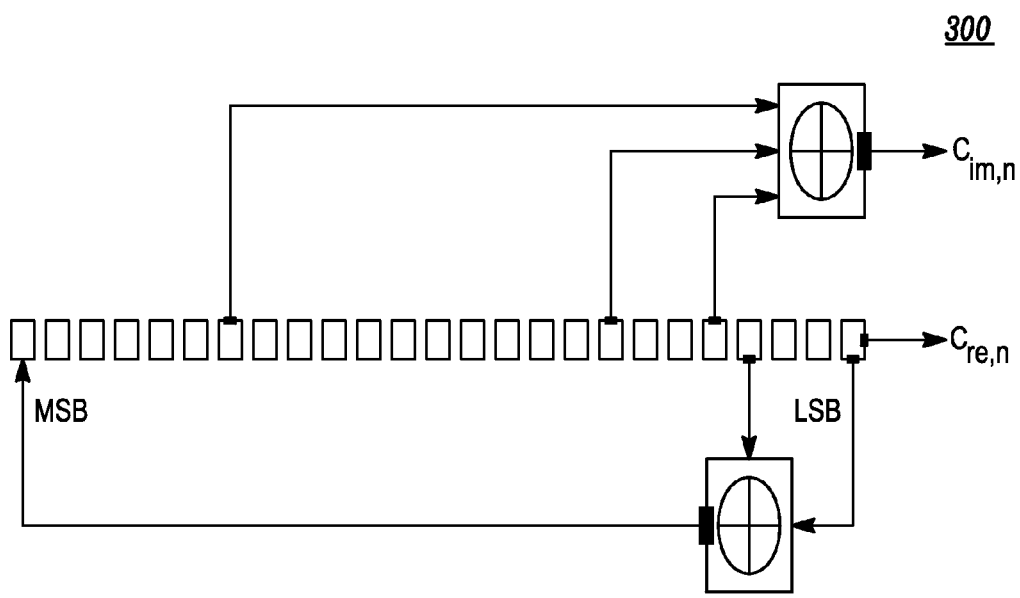
FIG. 3 illustrates a sequence generator.

In one implementation, generation of the QPSK RS sequence is based on the 3GPP Release 7 (Rel-7) uplink long scrambling PN generator. The length-N RS sequence (N=12/24 for 1/2 RB) is constructed from N chip segments of a binary m-sequence (denoted as x which is used for the real part, $c_{re,n}$, of the RS sequence) generated by means of a generator polynomial of degree 25 using the primitive (over GF(2)) polynomial $X^{25}+X^3+1$. The functionality of the sequence generator 300 illustrated in FIG. 3 may be implemented by the controller 200 of FIG. 2 at 226. The imaginary component of the RS sequence, $c_{im,n}$ is a 16777232 chip shifted version of the sequence $c_{re,n}$. In other implementations, a different shift value may be used. Let $n_{23} \ldots n_0$ be the 24 bit binary representation of the RS sequence index n with $n_0$ being the least significant bit. The x sequence depends on the chosen RS sequence index n and is denoted by $x_n$. Furthermore, let $x_n(i)$ denote the i:th element of the sequence $x_n$. The m-sequence $x_n$ is constructed as:

(1) Initial conditions
$x_n(0)=n_0$, $x_n(1)=n_1$, . . . $=x_n(22)=n_{22}$, $x_n(23)=n_{23}$, $x_n(24)=1$; and (2) Recursive definition of subsequent symbols
$x_n(i+25)=x_n(i+3)+x_n(i)$ modulo 2.

The real valued sequence $z_n$ is defined by the BPSK mapping:

$$z_n(i) = \begin{cases} +1 & \text{if } x_n(i) = 0 \\ -1 & \text{if } x_n(i) = 1 \end{cases} \text{ for } i = 0, 1, \ldots, 2^{25}-2$$

The real-valued RS sequences $c_{re,n}$ and $c_{im,n}$ are defined as follows:
$c_{re,n}(i)=z_n(i)$, i=0, 1, 2, . . . , N−1; and
$c_{im,n}(i)=z_n((i+16777232) \text{ modulo } (2^{25}-1))))$, i=0, 1, 2, . . . , N−1.

Finally, the complex-valued QPSK RS sequence $c_n$, is defined as:

$$c_n(i) = \frac{1}{\sqrt{2}} \cdot (c_{re,n}(i) + jc_{im,n}(i)) \quad i = 0, 1, \ldots, N-1.$$

Thus, the "I" (or real part) and "Q" (or imaginary part) components of the QPSK RS sequence based on Rel-7 PN are created by clocking the PN generator 12/24 times from the initial state for the 1/2 RB case. Thus, for 1/2 RB case, the "I" component corresponds to the initial shift register states $n_0 \ldots n_{23}$.

The extended-ZC sequence root indices for 1 and 2 RB with best CM are listed below.

1 RB (6): $N_{ZC}=11$, u=1, 4, 5=$\lfloor N_{ZC}/2 \rfloor$, 6=($N_{ZC}-5$), 7=($N_{ZC}-4$), 10=($N_{ZC}-1$) requiring 2 bits to represent u<$\lfloor N_{ZC}/2 \rfloor$ 2 RB (12): $N_{ZC}=23$, u=1, 4, 6, 8, 9, 11=$\lfloor N_{ZC}/2 \rfloor$, ($N_{ZC}-$u)=12, 14, 15, 17, 19, 22, requiring 4 bits to represent u<$\lfloor N_{ZC}/2 \rfloor$ The ZC sequences have better CM and cross-correlation properties than randomly generated sequences.

The length-N RS sequence can be time-domain cyclic shifted and is applied to N reference signal sub-carriers of the OFDM modulator.

Table 11 lists the RS sequence index/initial state corresponding to the 24 LSB bits of shift register for 1 resource block and for 2 resource blocks. For 1RB, the 8-bits $n_{23} \ldots n_{16}$ are set to 0.

TABLE 11

| 1 RB | 2 RB |
|---|---|
| 1296 | 3376735 |
| 4819 | 3657444 |
| 6167 | 4340788 |
| 11416 | 4555131 |
| 11554 | 4653374 |
| 18811 | 6784476 |
| 24117 | 7020705 |
| 24223 | 8043110 |
| 24740 | 8649752 |
| 26304 | 9258976 |
| 27300 | 9273642 |
| 28999 | 10492388 |
| 31301 | 10697518 |
| 33354 | 10994193 |

TABLE 11-continued

| 1 RB | 2 RB |
|---|---|
| 36156 | 11070674 |
| 37395 | 11262767 |
| 38718 | 13025429 |
| 44877 | 15106244 |
| 48685 | 1565627 |
| 49790 | 1608359 |
| 57022 | 1661884 |
| 60534 | 2020681 |
| 62772 | 3951058 |
| 65062 | 4097353 |
| 27881 | 9102473 |
| 40052 | 10226179 |
| 43037 | 11878221 |
| 45993 | 12855245 |
| 47523 | 14010560 |
| 58306 | 16113554 |

The initial states for 1 resource block (RB) in Table 11 will produce the sequence element values in Tables 3, 4, 7 and 8, and the initial states for the 2 RB case in Table 11 will produce the element values in Tables 5, 6, 9 and 10. The phase scaling factors of Tables 1 and 2 may be determined from the element values in Table 3 and 4 and Table 5 and 6, respectively. In other implementations, different PN generators (such as the Gold sequence generator) and/or other generator polynomials and corresponding initial states may be used to generate the sequence element values in Tables 1-10. Generally, any of the sequences may be scaled by some arbitrary scale factor with an arbitrary phase and/or be cyclically time shifted by an arbitrary cyclic shift value. In some applications, the user terminal generates QPSK sequences rather than use pre-stored sequences of Tables 1-10. More generally, a base station or other wireless communication device may generate and/or store sequences as discussed above for downlink transmissions.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A wireless communication user terminal, the terminal comprising:

a transceiver;

a controller communicably coupled to the transceiver and to memory, information stored in the memory, the information representative of a plurality of Quadrature Phase Shift Keying (QPSK) sequences, each of the QPSK sequence includes 24 elements wherein each of the 24 elements includes a phase component of $\pi/4$ weighted by a phase scaling factor, as follows:

| | Element Phase Scaling Factors | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| QPSK_Sequences | −3 | 3 | 3 | −1 | −1 | −3 | −1 | 3 | 1 | 3 | 1 | 3 |
| | −3 | 1 | 1 | 3 | −1 | 1 | 3 | 1 | −3 | 1 | −3 | 1 |
| | −3 | −3 | 1 | 1 | −1 | 1 | −1 | 1 | −1 | 3 | 1 | −3 |
| | −3 | −1 | −3 | 3 | 1 | −1 | −3 | −1 | −3 | −3 | 3 | −3 |
| | 3 | −1 | 3 | 3 | 1 | 1 | −3 | 3 | 3 | 3 | 3 | 1 |

| | Element Phase Scaling Factors | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| QPSK_Sequences | 1 | 1 | −1 | 3 | 1 | −1 | 1 | 3 | −3 | −1 | −1 | 1 |
| | 1 | −1 | −1 | 3 | −1 | −3 | 3 | −3 | −3 | −3 | 1 | 1 |
| | −1 | 1 | −1 | 1 | −1 | −1 | 3 | 3 | −3 | −1 | 1 | −3 |
| | 3 | −3 | −1 | 1 | 3 | 1 | −3 | 1 | 3 | 3 | −1 | −3 |
| | −1 | 3 | −1 | 1 | 1 | −1 | −3 | −1 | −1 | 1 | 3 | 3 | the controller configured to select a QPSK sequence and to generate a reference signal based on the information representative of the selected QPSK sequence.

2. The terminal of claim 1, the information stored in the memory is representative of the phase component of each of the 24 elements.

3. The terminal of claim 1, wherein each of the 24 elements further includes a phase component of $\pi/4$ weighted by a phase scaling factor as follows:

| | | Element Phase Scaling Factors | | | | | | | | | | | | | | | | | | | | | | | |
|---|---|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| QPSK_Sequences | 1 | −3 | 3 | −3 | 3 | 3 | −1 | 3 | 1 | −1 | 3 | −3 | 1 | −1 | 1 | 1 | 3 | 3 | −3 | 1 | −1 | −3 | −3 | 1 | 1 |
| | 2 | 1 | −1 | −3 | −1 | −1 | −3 | 3 | 3 | −1 | −3 | −3 | −3 | 1 | 1 | 3 | −3 | 3 | −3 | 3 | −1 | 3 | −3 | −1 | 1 |
| | 3 | −1 | −1 | 3 | −1 | 3 | −3 | −1 | −1 | 1 | −1 | −3 | −3 | −3 | −3 | −1 | 1 | −1 | −3 | 1 | 1 | 1 | −1 | 3 | −1 |
| | 4 | 3 | 3 | −1 | 3 | 3 | 3 | −3 | 1 | −3 | 1 | 1 | −1 | −1 | −1 | −1 | 3 | 3 | −1 | −3 | −1 | −1 | 1 | −3 | 1 |
| | 5 | 1 | 3 | 3 | 3 | 3 | 3 | −1 | −1 | 3 | −1 | 1 | 1 | −1 | −1 | −1 | 1 | 3 | −3 | 3 | 1 | 1 | −1 | 3 | −1 |
| | 6 | −1 | −1 | −3 | −3 | 1 | 3 | −3 | 3 | 1 | −1 | 1 | 1 | 1 | 1 | 3 | 3 | −3 | 3 | 1 | 1 | 3 | −3 | −3 | −1 |
| | 7 | −3 | 1 | 1 | 1 | −1 | 3 | 1 | −3 | 1 | −1 | −1 | −1 | −3 | 1 | 1 | 3 | −3 | 1 | 3 | 1 | 3 | −3 | 3 | 1 |
| | 8 | 1 | 3 | −3 | −1 | 1 | 3 | 3 | −1 | −1 | −3 | 1 | −3 | 3 | 3 | −1 | −3 | −1 | −3 | 1 | −3 | 3 | 3 | 3 | 1 |
| | 9 | −1 | 1 | 1 | −3 | −3 | 1 | −1 | −1 | −1 | 1 | −3 | 3 | −3 | −3 | −3 | 3 | 3 | −3 | −1 | 1 | −1 | 1 | −1 | −3 |
| | 10 | 1 | −1 | 1 | 1 | −1 | 3 | 3 | −3 | −3 | 3 | 3 | 1 | 1 | 1 | 3 | 1 | 3 | −3 | −1 | 3 | 1 | 1 | 1 | −3 |
| | 11 | −1 | −3 | 1 | 3 | −1 | −3 | −1 | −1 | 3 | 1 | −1 | 1 | 1 | −1 | 3 | −3 | −1 | −3 | −3 | −1 | 1 | −1 | −1 | −3 |
| | 12 | −1 | 1 | −3 | 1 | 1 | 3 | −3 | −3 | −3 | 1 | −1 | −3 | 3 | −1 | 1 | 1 | 1 | −1 | 1 | −1 | −3 | −1 | 1 | 3 |
| | 13 | 1 | 3 | −3 | −3 | 1 | −3 | 1 | 1 | 3 | 3 | 1 | 3 | −3 | 3 | −1 | 1 | −3 | −3 | 1 | −1 | −1 | −3 | −1 | −3 |
| | 14 | 3 | 1 | −1 | −1 | 3 | 1 | −1 | 1 | 1 | −3 | 1 | −1 | 1 | 3 | 3 | 3 | 3 | −1 | 1 | −3 | 1 | −3 | 1 | −3 |
| | 15 | 1 | −3 | −1 | −1 | −3 | −1 | −3 | 3 | −1 | −1 | 3 | −3 | −1 | −3 | 3 | −1 | 1 | 1 | 3 | 1 | 3 | −1 | −3 | −1 |
| | 16 | 3 | −3 | −3 | −3 | 1 | −3 | −1 | 1 | −3 | −3 | −1 | −3 | 3 | 1 | −3 | −3 | 3 | 1 | 3 | 1 | −3 | 1 | 3 | 3 |
| | 17 | −3 | 1 | 3 | −1 | −3 | −1 | −1 | 3 | 1 | −1 | 1 | 1 | −1 | 3 | −3 | −1 | −3 | −3 | −1 | 1 | −1 | −3 | −3 |
| | 18 | 1 | 1 | −3 | 1 | −1 | −1 | −3 | 3 | −1 | 1 | 1 | 1 | −1 | −3 | −1 | 3 | −3 | 1 | 1 | 3 | −3 | −3 | −3 |
| | 19 | −3 | 3 | 1 | −3 | −3 | −3 | 1 | −3 | −3 | −1 | 1 | −1 | −3 | 3 | −3 | 3 | 3 | −3 | −1 | 3 | −1 | 1 | 1 |
| | 21 | 1 | −1 | 3 | −3 | 3 | 3 | −1 | −3 | 3 | −3 | 1 | 3 | 3 | 1 | −3 | −1 | −3 | −1 | −1 | 3 | 3 | −1 | −1 | 1 |

-continued

| | | | | | | | | | | Element Phase Scaling Factors | | | | | | | | | | | | | | |
|---|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| | 22 | −3 | 1 | 1 | −3 | −1 | −1 | 3 | −1 | 3 | 1 | 3 | 1 | 3 | −1 | 3 | 3 | 1 | 3 | −3 | 3 | −3 | 1 | 1 | 1 |
| | 23 | −1 | 3 | 1 | 1 | 3 | 1 | −3 | 3 | 3 | 1 | 1 | −3 | 1 | 1 | −3 | −1 | −1 | 1 | 3 | 3 | −3 | 3 | −1 | 1 |
| | 25 | −3 | −1 | 1 | 3 | 1 | −1 | −1 | −3 | −1 | −1 | −3 | 1 | −1 | −3 | 3 | −3 | −1 | −3 | −1 | 3 | 1 | −1 | 1 | −3 |
| | 29 | 1 | 1 | 1 | −1 | 1 | −1 | −3 | 3 | −1 | −1 | 1 | −3 | −1 | 1 | 3 | 3 | 3 | −1 | −3 | 1 | 3 | 1 | −3 | −3 |
| | 30 | −1 | −3 | 1 | −1 | −3 | −1 | 1 | 3 | 3 | −3 | −3 | 3 | 3 | 1 | 3 | −3 | 3 | −1 | −3 | −1 | 3 | −3 | 3 | 3 |

4. The terminal of claim 3, the information stored in the memory is representative of a real part and an imaginary part of each of the 24 elements wherein the real parts of each of the 24 elements of the QPSK sequences are

| | | | Element Real Parts multiplied by sqrt(2) | | | | | | | | | | | | | | | | | | | | | | |
|---|---|---|---|---|---|---|---|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| QPSK_Sequences | 1 | −1 | −1 | −1 | −1 | −1 | 1 | −1 | 1 | 1 | −1 | −1 | 1 | 1 | 1 | 1 | −1 | −1 | −1 | 1 | 1 | −1 | −1 | 1 | 1 |
| | 2 | 1 | 1 | −1 | 1 | 1 | −1 | −1 | −1 | 1 | −1 | −1 | −1 | 1 | 1 | −1 | −1 | −1 | −1 | −1 | 1 | −1 | −1 | 1 | 1 |
| | 3 | 1 | 1 | −1 | 1 | −1 | −1 | 1 | 1 | 1 | 1 | −1 | −1 | −1 | 1 | 1 | 1 | 1 | −1 | 1 | 1 | 1 | 1 | −1 | 1 |
| | 4 | −1 | −1 | 1 | −1 | −1 | −1 | −1 | 1 | −1 | 1 | 1 | 1 | 1 | 1 | 1 | −1 | −1 | 1 | −1 | 1 | 1 | 1 | −1 | 1 |
| | 5 | 1 | −1 | −1 | −1 | 1 | −1 | 1 | 1 | 1 | 1 | 1 | 1 | 1 | 1 | 1 | 1 | −1 | −1 | −1 | 1 | 1 | 1 | −1 | 1 |
| | 6 | 1 | 1 | −1 | −1 | −1 | 1 | −1 | −1 | −1 | 1 | −1 | 1 | 1 | 1 | 1 | −1 | −1 | −1 | −1 | 1 | 1 | −1 | −1 | 1 |
| | 7 | −1 | 1 | 1 | 1 | 1 | −1 | 1 | −1 | 1 | 1 | 1 | 1 | −1 | 1 | 1 | −1 | −1 | 1 | −1 | 1 | −1 | −1 | −1 | 1 |
| | 8 | 1 | −1 | −1 | 1 | 1 | −1 | −1 | 1 | 1 | −1 | 1 | −1 | −1 | −1 | 1 | 1 | 1 | −1 | 1 | −1 | −1 | −1 | −1 | 1 |
| | 9 | 1 | 1 | 1 | −1 | −1 | 1 | 1 | 1 | 1 | 1 | −1 | −1 | −1 | 1 | −1 | 1 | −1 | −1 | 1 | 1 | 1 | 1 | 1 | −1 |
| | 10 | 1 | 1 | 1 | 1 | 1 | −1 | −1 | −1 | −1 | −1 | 1 | 1 | 1 | 1 | −1 | 1 | 1 | 1 | −1 | 1 | 1 | 1 | 1 | −1 |
| | 11 | 1 | −1 | 1 | −1 | 1 | −1 | 1 | 1 | −1 | 1 | 1 | 1 | 1 | 1 | −1 | 1 | −1 | 1 | −1 | 1 | 1 | 1 | 1 | −1 |
| | 12 | 1 | 1 | −1 | 1 | 1 | −1 | −1 | −1 | −1 | 1 | −1 | −1 | 1 | 1 | 1 | 1 | 1 | 1 | 1 | 1 | 1 | −1 | 1 | −1 |
| | 13 | 1 | −1 | −1 | −1 | 1 | −1 | 1 | −1 | 1 | 1 | −1 | −1 | −1 | 1 | 1 | −1 | 1 | 1 | 1 | 1 | 1 | −1 | 1 | −1 |
| | 14 | −1 | 1 | 1 | 1 | 1 | 1 | 1 | 1 | −1 | 1 | 1 | 1 | 1 | −1 | −1 | −1 | −1 | 1 | 1 | 1 | 1 | −1 | 1 | 1 |
| | 15 | 1 | −1 | 1 | 1 | −1 | 1 | −1 | −1 | 1 | 1 | −1 | −1 | 1 | −1 | −1 | 1 | 1 | 1 | −1 | 1 | 1 | 1 | 1 | −1 |
| | 16 | −1 | −1 | −1 | −1 | 1 | −1 | 1 | 1 | −1 | 1 | 1 | −1 | 1 | −1 | 1 | −1 | 1 | −1 | −1 | 1 | 1 | −1 | 1 | −1 |
| | 17 | −1 | 1 | −1 | 1 | −1 | 1 | 1 | −1 | 1 | 1 | 1 | 1 | 1 | −1 | 1 | −1 | 1 | −1 | 1 | 1 | 1 | 1 | −1 | −1 |
| | 18 | 1 | 1 | −1 | 1 | 1 | 1 | −1 | 1 | 1 | 1 | 1 | 1 | 1 | 1 | −1 | 1 | −1 | 1 | −1 | 1 | 1 | −1 | 1 | −1 |
| | 19 | −1 | −1 | 1 | −1 | −1 | 1 | 1 | 1 | −1 | 1 | 1 | 1 | −1 | −1 | −1 | 1 | −1 | −1 | −1 | −1 | 1 | 1 | 1 | 1 |
| | 20 | −1 | −1 | 1 | 1 | 1 | −1 | 1 | −1 | 1 | 1 | −1 | 1 | 1 | 1 | −1 | 1 | 1 | 1 | −1 | −1 | 1 | 1 | 1 | 1 |
| | 21 | 1 | 1 | −1 | −1 | −1 | −1 | 1 | −1 | 1 | 1 | 1 | −1 | 1 | −1 | 1 | −1 | 1 | 1 | 1 | −1 | −1 | 1 | 1 | 1 |
| | 22 | −1 | 1 | 1 | 1 | 1 | 1 | −1 | −1 | −1 | 1 | −1 | 1 | 1 | 1 | −1 | 1 | −1 | 1 | −1 | 1 | −1 | 1 | 1 | 1 |
| | 23 | 1 | −1 | 1 | 1 | −1 | 1 | −1 | −1 | −1 | 1 | 1 | −1 | 1 | 1 | −1 | 1 | 1 | 1 | −1 | 1 | −1 | −1 | 1 | 1 |
| | 24 | −1 | 1 | 1 | −1 | 1 | 1 | −1 | 1 | −1 | 1 | 1 | 1 | 1 | 1 | −1 | 1 | −1 | −1 | 1 | −1 | −1 | 1 | 1 | 1 |
| | 25 | −1 | 1 | 1 | 1 | 1 | 1 | 1 | −1 | 1 | 1 | −1 | 1 | 1 | −1 | −1 | 1 | 1 | −1 | 1 | −1 | 1 | 1 | 1 | −1 |
| | 26 | −1 | 1 | 1 | 1 | 1 | 1 | 1 | 1 | −1 | 1 | 1 | −1 | 1 | 1 | 1 | 1 | 1 | −1 | 1 | −1 | −1 | 1 | 1 | 1 |
| | 27 | −1 | 1 | −1 | −1 | 1 | 1 | 1 | −1 | 1 | −1 | −1 | −1 | −1 | 1 | 1 | −1 | 1 | 1 | 1 | −1 | −1 | −1 | 1 | 1 |
| | 28 | −1 | 1 | −1 | −1 | 1 | 1 | −1 | −1 | −1 | −1 | 1 | 1 | −1 | 1 | 1 | 1 | −1 | 1 | 1 | 1 | 1 | 1 | −1 | −1 |
| | 29 | 1 | 1 | 1 | 1 | 1 | 1 | −1 | −1 | 1 | 1 | 1 | −1 | 1 | 1 | −1 | −1 | −1 | 1 | −1 | 1 | −1 | 1 | −1 | −1 |
| | 30 | 1 | −1 | 1 | 1 | −1 | 1 | 1 | −1 | −1 | −1 | −1 | −1 | −1 | 1 | −1 | −1 | −1 | 1 | −1 | 1 | −1 | −1 | −1 | −1 | and the imaginary parts of each of the 24 elements of the QPSK sequences are

| | | | Element Imaginary Parts multiplied by sqrt(2) | | | | | | | | | | | | | | | | | | | | | | |
|---|---|---|---|---|---|---|---|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| QPSK_Sequences | 1 | −1 | 1 | −1 | 1 | 1 | −1 | 1 | 1 | −1 | 1 | −1 | 1 | −1 | 1 | 1 | 1 | 1 | −1 | 1 | −1 | −1 | −1 | 1 | 1 |
| | 2 | 1 | 1 | −1 | −1 | −1 | 1 | 1 | 1 | −1 | 1 | −1 | 1 | 1 | 1 | 1 | −1 | 1 | −1 | 1 | 1 | 1 | −1 | −1 | 1 |
| | 3 | −1 | −1 | 1 | −1 | 1 | −1 | −1 | −1 | 1 | 1 | −1 | −1 | −1 | −1 | 1 | −1 | 1 | 1 | 1 | 1 | 1 | 1 | 1 | −1 |
| | 4 | 1 | 1 | −1 | 1 | 1 | 1 | −1 | 1 | −1 | 1 | 1 | −1 | −1 | −1 | 1 | 1 | −1 | −1 | −1 | −1 | 1 | −1 | 1 | 1 |
| | 5 | 1 | 1 | 1 | 1 | 1 | 1 | −1 | −1 | 1 | 1 | 1 | −1 | −1 | −1 | 1 | 1 | −1 | 1 | 1 | 1 | 1 | −1 | 1 | −1 |
| | 6 | −1 | −1 | −1 | −1 | 1 | 1 | 1 | 1 | 1 | −1 | 1 | 1 | 1 | 1 | 1 | 1 | 1 | 1 | 1 | −1 | 1 | 1 | −1 | −1 |
| | 7 | −1 | 1 | 1 | 1 | −1 | 1 | 1 | 1 | −1 | 1 | −1 | −1 | −1 | 1 | 1 | 1 | −1 | 1 | 1 | 1 | 1 | −1 | 1 | 1 |
| | 8 | 1 | −1 | −1 | 1 | 1 | 1 | 1 | −1 | −1 | 1 | −1 | 1 | 1 | −1 | −1 | −1 | 1 | −1 | 1 | 1 | 1 | 1 | 1 | 1 |
| | 9 | −1 | 1 | 1 | −1 | −1 | 1 | −1 | −1 | −1 | 1 | −1 | 1 | −1 | −1 | 1 | −1 | 1 | −1 | 1 | −1 | 1 | 1 | −1 | −1 |
| | 10 | 1 | −1 | 1 | 1 | 1 | −1 | 1 | 1 | −1 | 1 | 1 | 1 | −1 | 1 | 1 | 1 | 1 | −1 | −1 | 1 | 1 | 1 | 1 | 1 |
| | 11 | −1 | −1 | 1 | 1 | 1 | −1 | −1 | 1 | 1 | 1 | 1 | 1 | 1 | −1 | 1 | 1 | −1 | 1 | 1 | 1 | 1 | 1 | −1 | −1 |
| | 12 | −1 | 1 | −1 | 1 | 1 | 1 | −1 | −1 | 1 | −1 | −1 | 1 | 1 | 1 | 1 | 1 | 1 | 1 | 1 | 1 | 1 | −1 | −1 | 1 |
| | 13 | 1 | 1 | −1 | −1 | 1 | −1 | 1 | 1 | 1 | 1 | −1 | 1 | −1 | 1 | 1 | −1 | 1 | −1 | 1 | −1 | −1 | −1 | −1 | 1 |
| | 14 | 1 | 1 | −1 | −1 | 1 | 1 | 1 | 1 | 1 | 1 | −1 | 1 | −1 | 1 | 1 | 1 | 1 | 1 | 1 | −1 | 1 | −1 | 1 | −1 |
| | 15 | 1 | 1 | −1 | 1 | −1 | −1 | 1 | −1 | 1 | −1 | −1 | −1 | −1 | −1 | 1 | 1 | −1 | 1 | 1 | 1 | 1 | 1 | −1 | −1 |
| | 16 | 1 | −1 | −1 | −1 | 1 | −1 | 1 | 1 | −1 | 1 | −1 | −1 | −1 | 1 | 1 | −1 | −1 | 1 | 1 | 1 | 1 | 1 | −1 | 1 |

-continued

| | Element Imaginary Parts multiplied by sqrt(2) | | | | | | | | | | | | | | | | | | | | | | | |
|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 17 | −1 | 1 | 1 | −1 | −1 | −1 | −1 | 1 | 1 | −1 | 1 | 1 | 1 | −1 | 1 | −1 | −1 | −1 | −1 | −1 | 1 | −1 | −1 | −1 |
| 18 | 1 | 1 | −1 | 1 | −1 | −1 | −1 | 1 | −1 | −1 | 1 | −1 | 1 | 1 | −1 | −1 | −1 | 1 | −1 | 1 | 1 | 1 | −1 | −1 |
| 19 | −1 | 1 | 1 | −1 | −1 | −1 | 1 | −1 | −1 | −1 | −1 | 1 | −1 | −1 | 1 | −1 | 1 | 1 | −1 | −1 | 1 | −1 | 1 | 1 |
| 20 | −1 | 1 | 1 | −1 | −1 | −1 | −1 | 1 | 1 | 1 | 1 | 1 | 1 | −1 | 1 | 1 | 1 | −1 | 1 | 1 | −1 | −1 | −1 | 1 |
| 21 | 1 | −1 | 1 | −1 | 1 | 1 | −1 | −1 | 1 | −1 | 1 | 1 | 1 | 1 | −1 | −1 | −1 | −1 | 1 | 1 | −1 | 1 | −1 | 1 |
| 22 | −1 | 1 | 1 | −1 | −1 | −1 | 1 | −1 | 1 | 1 | 1 | 1 | 1 | −1 | 1 | 1 | 1 | 1 | −1 | 1 | −1 | 1 | 1 | 1 |
| 23 | −1 | 1 | 1 | 1 | 1 | 1 | −1 | 1 | 1 | 1 | 1 | −1 | 1 | 1 | −1 | −1 | −1 | 1 | 1 | 1 | −1 | 1 | −1 | 1 |
| 24 | −1 | 1 | 1 | 1 | −1 | 1 | 1 | 1 | −1 | 1 | −1 | 1 | 1 | −1 | −1 | 1 | −1 | −1 | 1 | −1 | −1 | −1 | 1 | 1 |
| 25 | −1 | −1 | 1 | 1 | 1 | −1 | 1 | −1 | −1 | −1 | −1 | 1 | −1 | −1 | 1 | −1 | −1 | −1 | −1 | 1 | 1 | −1 | 1 | −1 |
| 26 | −1 | −1 | 1 | 1 | −1 | 1 | −1 | 1 | −1 | 1 | 1 | −1 | 1 | −1 | 1 | −1 | 1 | −1 | 1 | 1 | −1 | −1 | 1 | −1 |
| 27 | −1 | −1 | −1 | 1 | 1 | −1 | −1 | −1 | −1 | −1 | 1 | −1 | 1 | −1 | 1 | 1 | 1 | −1 | 1 | 1 | 1 | 1 | −1 | −1 |
| 28 | 1 | −1 | 1 | 1 | 1 | 1 | −1 | 1 | 1 | 1 | 1 | 1 | −1 | 1 | −1 | 1 | 1 | −1 | −1 | −1 | −1 | 1 | 1 | 1 |
| 29 | 1 | 1 | 1 | −1 | 1 | −1 | −1 | 1 | −1 | 1 | 1 | −1 | 1 | 1 | 1 | 1 | 1 | −1 | 1 | 1 | 1 | 1 | −1 | −1 |
| 30 | −1 | −1 | 1 | −1 | −1 | −1 | 1 | 1 | 1 | −1 | −1 | 1 | 1 | 1 | 1 | −1 | 1 | −1 | −1 | −1 | 1 | −1 | 1 | 1 |

5. The terminal of claim 1, the information stored in the memory is representative of a real part and an imaginary part of each of the 24 elements.

6. The terminal of claim 5, wherein the real parts of each of the 24 elements of the QPSK sequences are:

| | Element Real Parts multiplied by 1.414 | | | | | | | | | | | | | | | | | | | | | | | |
|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| QPSK_Sequences | −1 | −1 | −1 | 1 | 1 | −1 | 1 | −1 | 1 | −1 | 1 | −1 | 1 | 1 | 1 | −1 | 1 | 1 | 1 | −1 | −1 | 1 | 1 | 1 |
| | −1 | 1 | 1 | −1 | 1 | 1 | −1 | 1 | −1 | 1 | −1 | 1 | 1 | 1 | 1 | −1 | 1 | −1 | −1 | −1 | −1 | −1 | 1 | 1 |
| | −1 | −1 | 1 | 1 | 1 | 1 | 1 | 1 | 1 | −1 | 1 | −1 | 1 | 1 | 1 | 1 | 1 | −1 | −1 | −1 | 1 | 1 | 1 | −1 |
| | −1 | 1 | −1 | −1 | 1 | 1 | −1 | 1 | −1 | −1 | −1 | −1 | −1 | −1 | 1 | −1 | −1 | 1 | −1 | −1 | 1 | −1 | −1 | −1 |
| | −1 | 1 | −1 | −1 | 1 | 1 | −1 | −1 | −1 | −1 | −1 | 1 | 1 | −1 | 1 | 1 | 1 | 1 | −1 | 1 | 1 | 1 | −1 | −1 | and the imaginary parts of each of the 24 elements of the QPSK sequences are:

| | Element Imaginary Parts multiplied by 1.414 | | | | | | | | | | | | | | | | | | | | | | | |
|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| QPSK_Sequences | −1 | 1 | 1 | −1 | −1 | −1 | −1 | 1 | 1 | 1 | 1 | 1 | 1 | −1 | 1 | 1 | −1 | 1 | 1 | −1 | −1 | −1 | 1 |
| | −1 | 1 | 1 | 1 | −1 | 1 | 1 | 1 | −1 | 1 | −1 | 1 | 1 | −1 | −1 | 1 | −1 | −1 | 1 | −1 | −1 | −1 | 1 | 1 |
| | −1 | −1 | 1 | 1 | −1 | 1 | −1 | 1 | −1 | 1 | 1 | −1 | −1 | 1 | −1 | −1 | 1 | 1 | −1 | 1 | −1 | −1 | 1 | −1 |
| | −1 | −1 | −1 | 1 | 1 | −1 | −1 | −1 | −1 | 1 | −1 | 1 | −1 | −1 | 1 | 1 | −1 | 1 | 1 | 1 | 1 | −1 | −1 |
| | 1 | −1 | 1 | 1 | 1 | 1 | −1 | 1 | 1 | 1 | 1 | −1 | 1 | −1 | 1 | 1 | −1 | −1 | −1 | −1 | 1 | 1 | 1 |

7. The terminal of claim 5, each element includes a real part of 1/sqrt(2) and an imaginary part of 1/sqrt(2) wherein the real part and the imaginary part are weighted by a +/−1 scaling factor indicated by a "0" value or a "1" value as follows:

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| | Element Real Part | | | | | | | | | | | | | | | | | | | | | | | |
| QPSK_Sequences | 1 | 1 | 1 | 0 | 0 | 1 | 0 | 1 | 0 | 1 | 0 | 1 | 0 | 0 | 0 | 1 | 0 | 0 | 0 | 1 | 1 | 0 | 0 | 0 |
| | 1 | 0 | 0 | 1 | 0 | 0 | 1 | 0 | 1 | 0 | 1 | 0 | 0 | 0 | 0 | 1 | 0 | 1 | 1 | 1 | 1 | 1 | 0 | 0 |
| | 1 | 1 | 0 | 0 | 0 | 0 | 0 | 0 | 0 | 1 | 0 | 1 | 0 | 0 | 0 | 0 | 0 | 1 | 1 | 1 | 0 | 0 | 0 | 1 |
| | 1 | 0 | 1 | 1 | 0 | 0 | 1 | 0 | 1 | 1 | 1 | 1 | 1 | 1 | 0 | 1 | 1 | 0 | 1 | 1 | 0 | 1 | 1 | 1 |
| | 1 | 0 | 1 | 1 | 0 | 0 | 1 | 1 | 1 | 1 | 1 | 0 | 0 | 1 | 0 | 0 | 0 | 0 | 1 | 0 | 0 | 0 | 1 | 1 |
| | and | | | | | | | | | | | | | | | | | | | | | | | |
| | Element Imaginary Part | | | | | | | | | | | | | | | | | | | | | | | |
| QPSK_Sequences | 1 | 0 | 0 | 1 | 1 | 1 | 1 | 0 | 0 | 0 | 0 | 0 | 0 | 1 | 0 | 0 | 1 | 0 | 0 | 1 | 1 | 1 | 1 | 0 |
| | 1 | 0 | 0 | 0 | 1 | 0 | 0 | 0 | 1 | 0 | 1 | 0 | 0 | 1 | 1 | 0 | 1 | 1 | 0 | 1 | 1 | 1 | 0 | 0 |

-continued

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|----|----|----|----|----|----|----|----|----|----|----|----|----|----|----|
| 1 | 1 | 0 | 0 | 1 | 0 | 1 | 0 | 1 | 0  | 0  | 1  | 1  | 0  | 1  | 0  | 1  | 1  | 0  | 0  | 1  | 1  | 0  | 1  |
| 1 | 1 | 1 | 0 | 0 | 1 | 1 | 1 | 1 | 0  | 1  | 0  | 1  | 1  | 0  | 0  | 0  | 1  | 0  | 0  | 0  | 1  | 1  |    |
| 0 | 1 | 0 | 0 | 0 | 0 | 1 | 0 | 0 | 0  | 0  | 0  | 1  | 0  | 1  | 0  | 0  | 1  | 1  | 1  | 1  | 0  | 0  | 0. |

8. The terminal of claim 1, the controller configured to generate the reference signal by modulating the selected QPSK sequence on a set of sub-carriers.

9. The terminal of claim 1, the controller configured to cyclically time shift the selected QPSK sequence prior to generating the reference signal.

10. The terminal of claim 1, the controller configured to select the QPSK sequence based on base station identification.

* * * * *